United States Patent
Fujiwara

(10) Patent No.: US 7,712,371 B2
(45) Date of Patent: *May 11, 2010

(54) LOAD SENSOR-EQUIPPED OPERATING APPARATUS

(75) Inventor: Noboru Fujiwara, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 244 days.

This patent is subject to a terminal disclaimer.

(21) Appl. No.: 11/822,817

(22) Filed: Jul. 10, 2007

(65) Prior Publication Data

US 2008/0307920 A1   Dec. 18, 2008

(51) Int. Cl.
*G01B 7/16* (2006.01)
(52) U.S. Cl. ............................. 73/774; 73/760
(58) Field of Classification Search ............ 73/760–860
See application file for complete search history.

(56) References Cited

U.S. PATENT DOCUMENTS

| 4,978,177 | A | 12/1990 | Ingraham |
| 5,563,355 | A | 10/1996 | Pluta et al. |
| 5,964,122 | A * | 10/1999 | Bonnard et al. ......... 74/473.12 |
| 6,234,290 | B1 * | 5/2001 | Drexl et al. ............ 192/85 CA |
| 6,655,199 | B1 * | 12/2003 | Smith ..................... 73/114.01 |
| 7,328,933 | B2 * | 2/2008 | Vitale et al. ............. 296/146.4 |
| 2008/0223171 | A1 * | 9/2008 | Fujiwara et al. ............ 74/512 |
| 2008/0250894 | A1 * | 10/2008 | Fujiwara ..................... 74/514 |

FOREIGN PATENT DOCUMENTS

| EP | 1 557 653 | 7/2005 |
| EP | 1 577 184 | 9/2005 |
| EP | 1 591 331 | 11/2005 |
| JP | 11 255084 | 9/1999 |

* cited by examiner

*Primary Examiner*—Max Noori
(74) *Attorney, Agent, or Firm*—Finnegan, Henderson, Farabow, Garrett & Dunner, LLP.

(57) ABSTRACT

A load sensor-equipped operation apparatus. An operational member is movably operated. A reaction force member receives an operating force from the operational member, and a reaction force corresponding to the operation force. At least one pivotal connecting portion is interposed between the operational member and the reaction force member, pivotably connecting a pair of a first member and a second member relative to each other to transmit the operating force. A load sensor, which electrically detects the operating force, includes a shaft-like member, a main body member disposed to be relatively displaced in a direction perpendicular to an axis of the shaft-like member, a deformable member bridging the shaft-like member and the main body member, and a strain detecting element secured to the deformable member, which detects deformation of the deformable member. A transmittal link connects the first member to one of the shaft-like member and the main body.

13 Claims, 14 Drawing Sheets

LOAD SENSOR-EQUIPPED OPERATING APPARATUS

The present application is based on Japanese Patent Application No. 2007-156606 filed in Japan, the content of which is incorporated herein by way of reference.

BACKGROUND OF THE INVENTION

1. Field of the Invention

The present invention relates to an operating apparatus such as a vehicle operating pedal apparatus, and in particular to improvements to a load sensor-equipped operating apparatus that includes a load sensor which electrically detects operating force.

2. Description of Related Art

A load sensor-equipped operating apparatus is known which includes (a) an operational member which is movably operated; (b) a reaction force member that receives the operating force of the operational member transmitted thereto, and on which a reaction force corresponding to the operating force is acted; (c) at least one pivotal connecting portion which is located between the operational member and the reaction force member, and connects a pair of the members pivotably relative to each other to transmit the operating force; and (d) a load sensor which electrically detects the operating force. Patent Document 1 discloses a vehicle brake pedal apparatus as one example of this type of load sensor-equipped operating apparatus. In this apparatus, a push rod (reaction force member) protrudes from a master cylinder, and is connected axially-movably relative to a connecting pin which protrudes from a side of an operational pedal. A sensor detects displacement of the push rod which is displaced against bias force of a spring relative to the connecting pin.

Patent Document 1: U.S. Pat. No. 5,563,355

However, in the apparatus disclosed in Patent Document 1, the push rod is required to have an elongated hole to allow it to move axially relative to the connecting pin. For this reason, normal push rods cannot be used as they are. In addition to this, since the push rod is pivoted relative to the connecting pin when the operational pedal is depressed, the spring biasing the push rod and the sensor detecting the displacement are also required to be pivotable relative to the connecting pin. As a result, firstly, the structure of the apparatus becomes complicated. Secondly, since the push rod, the spring and the sensor are located on the side of the operational pedal, they are required to have a rigid structure which ensures a stably operative state. In particular, this requirement is important for a brake pedal and the like. Consequently, this type of apparatus is large-size and becomes expensive as a whole.

In relation to this, although not publicly known, a technology has been conceived which provides compact arrangement of a load sensor or load detecting sensor at the connection point of a clevis pin as shown in FIG. 16. An operating pedal apparatus 200 for a vehicle service brake is shown in FIG. 16. FIG. 16(a) is a front view of the operating pedal apparatus 200, and FIG. 16(b) is an enlarged cross-sectional view taken along a line XVIA-XVIA in FIG. 16(a). A plate-like operational pedal 16 is attached to a pedal support 12 which is integrally secured to a vehicle, to be pivotable about an axis of a substantially horizontal supporting shaft 14. A depression portion (pad) 18 is located at the lower end of the operational pedal 16 which is depressed by a driver when the braking operation is required, and an operating rod 22 of a brake booster is connected to the middle part of the operational pedal 16 via a pivotal connecting portion 20.

The pivotal connecting portion 20 includes a U-shaped clevis 24 which is integrally secured to the ends of the operating rod 22 by a screw connecting or the like, and a clevis pin 26 which is located in the operational pedal 16 in parallel to the support shaft 14. The operating rod 22 and the operational pedal 16 are pivotably connected relative to each other about an axis of the clevis pin 26. Both end portions or opposite end portions of the clevis pin 26 protrude from both sides of the operational pedal 16, and are locked into the U-shaped clevis 24 by a snap ring, a retaining pin or the like so as not to drop off from the clevis 24.

An output in accordance with the operating force of the operational pedal 16 is transmitted to the operating rod 22 via the pivotal connecting portion 20. A reaction force corresponding to the output is applied to the operational pedal 16 by a brake booster. That is, this operating rod 22 corresponds to a reaction force member. In a by-wire type operating pedal apparatus in which a wheel brake is electrically controlled, a reaction force member which is acted upon by a given amount of reaction force by a reaction force mechanism or the like is connected to the pivotal connecting portion 20 instead of the operating rod 22.

A sensor attaching hole 202 with a diameter larger than the clevis pin 26 is located at the connecting position of the operational pedal 16 where the operational pedal 16 is connected to the clevis pin 26. A load sensor 30 is arranged in the annular space between the sensor attaching hole 202 and the clevis pin 26. The load sensor 30 includes a cylindrical deformable member 32 which detects the load applied in the radial direction thereof. The load sensor 30 additionally includes a cylindrical annular member 34 arranged on an outer periphery side of the deformable member 32, and a shaft-like member 36 arranged on an inner periphery side of the deformable member 32. The annular member 34, corresponds to a claimed main body member, is integrally assembled to the sensor attaching hole 202 at a constant orientation (phase) by press fitting, or by a bolt, a leaf spring or the like. One axial end of the deformable member 32 (the upper end in FIG. 16(b)) is integrally retained to the annular member 34 by welding or the like.

The other axial end of the deformable member 32 (the lower end in FIG. 16(b)) is integrally retained to the shaft-like member 36 by welding or the like. The clevis pin 26 is inserted into an insertion hole 38 which is arranged in the axial part of the shaft-like member 36. The clevis pin 26 is rotatable relative to both the insertion hole 38 and the clevis 24. The clevis pin 26 rotates relative to one of the insertion hole 38 and the clevis 24 that has lower friction when the operational pedal 16 is depressed. Note that a bearing or a bushing may be arranged between the clevis pin and the insertion hole or the clevis in order to reduce friction.

The annular member 34 and the shaft-like member 36 are thus connected by the deformable member 32. When substantially no load is applied from the outside in a radial direction, i.e., in a direction perpendicular to the axis, the members 32, 34 and 36 are retained substantially concentrically to the axis of the clevis pin 26. When a load is applied in a radial direction between the annular member 34 and the shaft-like member 36 by the reaction force of the operating rod 22 with depression of the operational pedal 16, the deformable member 32 is shear-deformed. As a result, the annular member 34 on the operational pedal 16 side displaces relative to the shaft-like member 36 in the direction to be closer to the operating rod 22 (leftward in FIG. 16). An annular space is provided between the annular member 34 and the shaft-like member 36 to allow both the relative radial displacement therebetween, and the shear deformation of the deformable member 32.

The deformable member 32 is made of a metal material such as a ferritic stainless steel alloy which can be elastically deformed by being applied a load in a radial direction, and is shear-deformed in accordance with the operating force with depression of the operational pedal 16. A strain detecting element such as a strain resistance element attached on the outer or inner peripheral surface of the deformable member 32 to detect the shear strain of the deformable member 32 is connected to a control circuit portion of the vehicle via a wire harness 56. Depressing operating force is detected based on the electrical signal which is outputted from the strain detecting element.

In the vehicle operating pedal apparatus 200, at the pivotal connecting portion 20 that transmits the operating force applied to the operational pedal 16 to the operating rod 22, the sensor attaching hole 202 is provided in the operational pedal 16 pivotably connected by the clevis pin 26 to the operating rod 22. Owing to the cylindrical load sensor 30 arranged in the annular space between the sensor attaching hole 202 and the clevis pin 26, rotational moment such as torsion is suppressed, so that the operating pedal apparatus 200 can be constructed simple and compact as a whole. In addition to this, for peripheral members such as the operating rod 22 and the clevis 24, similar members used in conventional pedal apparatuses can be used, which constructs the apparatus at low cost.

However, even in the vehicle operating pedal apparatus 200, when the operational pedal 16 is pivoted about the support shaft 14 by a depressing operation, the operating rod 22 and the operational pedal 16 are also pivoted about the axis of the clevis pin 26. For this reason, the acting position of the load which is applied to the deformable member 32, in other words, the relative displacing direction between the shaft-like member 36 and the annular member 34, varies. This variation may cause variation in the detection value. The size, arrangement and the like of the strain detecting element is set to allow detection of the deformation of the deformable member 32, irrespective of such variation in the deformation position of the deformable member 32. Nevertheless, the deformation position of the deformable member 32 continuously moves in the circumferential direction, and deformation mode thereof is complicated and is likely to vary. For this reason, depending on relative spatial relationships between the operating rod 22 or the operational pedal 16, ensuring high detection accuracy may be difficult.

The present invention has been made in consideration of the above situations, and its object is, in a load sensor-equipped operating apparatus including a load sensor provided in a pivotal connecting portion, to improve the detection accuracy of the load sensor. The load sensor electrically detects operating force based on relative displacement between a shaft-like member and a main body member (annular member 34 in FIG. 16) in a direction perpendicular to an axis of the shaft-like member.

SUMMARY OF THE INVENTION

For achieving the above object, the first aspect of the invention is related to a load sensor-equipped operating apparatus, comprises (a) an operational member which is movably operated; (b) a reaction force member which receives an operating force of the operational member transmitted thereto, and on which a reaction force corresponding to the operating force is acted; (c) at least one pivotal connecting portion which is interposed between the operational member and the reaction force member, and pivotably connects a pair of a first member and a second member relative to each other to transmit the operating force; and (d) a load sensor which electrically detects the operating force.

The load sensor-equipped operating apparatus further comprises (e) the load sensor includes a shaft-like member, a main body member disposed to be relatively displaced in a direction perpendicular to an axis of the shaft-like member, a deformable member bridging the shaft-like member and the main body member, and a strain detecting element which is secured to the deformable member, and the shaft-like member and the main body member are relatively displaced by the reaction force in the direction perpendicular to the axis of the shaft-like member to deform the deformable member so that the strain detecting element detects the deformation of the deformable member; (f) a transmittal link, one end of which is connected to the first member by a connecting pin, and other end of which is integrally secured to one of the shaft-like member and the main body member of the load sensor; (g) other of the shaft-like member and the main body member of the load sensor is connected to the second member; and (h) the connecting pin is arranged, in a front view of the load sensor as viewed in the axial direction, on an acting line of the load which is applied to the load sensor associating with a movable operation of the operational member, at a position generating tensile force in the transmittal link, so that a pivotal movement of the transmittal link about the connecting pin or the load sensor associating with the movable operation of the operational member maintains the direction of relative displacement between the shaft-like member and the main body member of the load sensor constant.

The second aspect of the present invention is featured by, in the load sensor-equipped operation apparatus in the first aspect of the invention, that (a) the load sensor is rockable relative to the first member about the connecting pin, and (b) the transmittal link is pivoted integrally with the load sensor about the connecting pin relative to the first member associating with the movable operation of the operational member.

The third aspect of the present invention is featured by, in the load sensor-equipped operation apparatus in the second aspect of the invention, that (a) the first member is a plate-shaped member, the connecting pin passes through the first member, and the pair of transmittal links are arranged on both side surfaces of the first member and are connected to both ends of the connecting pin, (b) the main body member of the load sensor protrudes from both side surfaces of the plate-shaped first member, is rockable about the connecting pin, and is secured integrally to the pair of transmittal links on both ends thereof in the axial direction, and (c) the second member is connected to both ends of a sensor pin which is inserted into the shaft-like member along an axis thereof and protrudes from both sides of the main body member.

The fourth aspect of the present invention is featured by, in the load sensor-equipped operation apparatus in the second aspect or third aspect of the invention, that (a) in the front view of the load sensor as viewed in the axial direction, the second member has an positioning hole to be located on the acting line of the load applied to the load sensor with the movable operation of the operational member at the position corresponding to the connecting pin, and to be in parallel to the acting line, and (b) the positioning hole is engaged with the connecting pin to determine an orientation of the second member provided with the positioning hole and the transmittal link.

The fifth aspect of the present invention is featured by, in the load sensor-equipped operation apparatus in one of the second aspect to fourth aspect of the invention, that the second member is the reaction force member, and the load sensor detects the operating force which is transmitted to the reaction force member.

The sixth aspect of the present invention is featured by, in the load sensor-equipped operation apparatus in the first aspect of the invention, that (a) the connecting pin is rockable about the load sensor relative to the second member, and (b) the transmittal link is pivoted about the load sensor integrally with the load sensor relative to the second member associating with the movable operation of the operational member.

The seventh aspect of the present invention is featured by, in the load sensor-equipped operation apparatus in the sixth aspect of the invention, that (a) the second member is a plate-shaped member, and the main body member is pivotably arranged in a sensor accommodating hole which penetrates the second member, (b) the pair of transmittal links are arranged on both side surfaces of the plate-shaped second member and are integrally secured to both ends of the shaft-like member which protrudes from both side surfaces of the main body member in the axial direction, and (c) the connecting pin is connected to the pair of transmittal links bridging thereover.

The eighth aspect of the present invention is featured by, in the load sensor-equipped operation apparatus in the sixth aspect or seventh aspect of the invention, that (a) the main body member of the load sensor is pivotably arranged in the second member, and the transmittal link is integrally secured to the shaft-like member, (b) a sensor pin is arranged in the shaft-like member to be inserted along the axis, (c) the first member has an positioning hole which is arranged, in the front view as viewed in the axial direction, to be located at the position corresponding to the sensor pin and to be in parallel to the acting line of the load, and (d) the positioning hole is engaged with the sensor pin to determine the orientation of the first member provided with the positioning hole and the transmittal link.

The ninth aspect of the present invention is featured by, in the load sensor-equipped operation apparatus in one of the sixth aspect to eighth aspect of the invention, that the first member is the reaction force member, and the load sensor detects the operating force which is transmitted to the reaction force member.

The tenth aspect of the present invention is featured by, in the load sensor-equipped operation apparatus in the first aspect to ninth aspect of the invention, that (a) the operational member is an operational pedal movably mounted on a pedal support secured to a vehicle body and depressed by a driver, and (b) the load sensor-equipped operating apparatus is a vehicle operating pedal apparatus equipped with the load sensor.

The eleventh aspect of the present invention is featured by, in the load sensor-equipped operation apparatus in the tenth aspect of the invention, that the operational pedal is mounted on the pedal support to be pivotable about a support axis and is directly connected to the reaction force member via the pivotal connecting portion, and the load sensor is arranged within the pivotal connecting portion.

The twelfth aspect of the present invention is featured by, in the load sensor-equipped operation apparatus in the tenth aspect of the invention, (a) further comprising an intermediate lever which is pivotably mounted on the pedal support, is connected to the operational pedal via a connecting link, and is connected to the reaction force member via the pivotal connecting portion, (b) wherein the load sensor is arranged in the pivotal connecting portion between the intermediate lever and the reaction force member.

The thirteenth aspect of the present invention is featured by, in the load sensor-equipped operation apparatus in the first aspect to twelfth aspect of the invention, wherein the deformable member has a cylindrical shape one end and other end of which are integrally secured to the main body member and the shaft-like member respectively, so that the strain detecting element detects the shear strain generated in the deformable member when the main body member and the shaft-like member are relatively displaced by the reaction force.

In the load sensor-equipped operation apparatus of the present invention, the load sensor which electrically detects the operating force based on the relative displacement between the main body member and the shaft-like member is disposed in the pivotably connecting portion where the paired first member and second member are connected, to detect the operating force transmitted through the pivotably connection portion. Thus, entire of the apparatus can be constructed simply and compactly.

Also, in the present invention, the transmittal link is connected to the first member of the pivotably connecting portion by a connecting pin. One of the shaft-like member and the main body member of the load sensor is integrally secured to the transmittal link, and other of them is connected to the second member. The connecting pin is arranged, on an acting line of the load which is applied to the load sensor, at a position generating tensile force in the transmittal link.

Accordingly, associating with the movable operation of the operational member, the transmittal link is pivoted about the connecting pin or the load sensor, so that the direction of relative displacement between the shaft-like member and the main body member of the load sensor is maintained substantially constant.

Concretely, the transmittal link is pivoted about the connecting pin integrally with the load sensor relative to the first member with the movable operation of the operational member as described in the second aspect of the invention, or the transmittal link is pivoted about the load sensor integrally with the load sensor relative to the second member associating with the movable operation of the operational member as described in the sixth aspect of the invention. With this structure, the relative displacing direction between the shaft-like member and the main body member of the load sensor is maintained substantially constant, resulting in that substantially the same part of the deformable member is deformed. Thus, the detecting accuracy of operating force is improved and variation in detecting accuracy is suppressed, which renders high reliability.

In the third aspect of the present invention, the connecting pin passes through the first member, the pair of transmittal links are arranged on both side surfaces of the first member and are connected to both ends of the connecting pin. The main body member of the load sensor protrudes from the both side surfaces of the plate-shaped first member and is rockable about the connecting pin, and is secured integrally to the pair of transmittal links on both ends thereof. The second member is connected to both ends of a sensor pin which is inserted into the shaft-like member along an axis thereof.

With this structure, the load is substantially uniformly applied to the load sensor in the axial direction thereof to relatively displace the main body member and the shaft-like member in parallel in the radial direction. As a result, suppression of rotational moment such as torsion operates the load sensor stably, so that the detection accuracy of the operating force is further improved. In addition to this, substantially overlapping arrangement of the load sensor with the first member can make the apparatus compact.

In the fourth aspect of the present invention, in the front view of the load sensor as viewed in the axial direction, the second member has an positioning hole to be located on the acting line of the load applied to the load sensor with the movable operation of the operational member at the position corresponding to the connecting pin, and to be in parallel to the acting line. The positioning hole is engaged with the connecting pin.

With this structure, the transmittal link is mechanically and reliably pivoted associating with the movable operation of the operational member, resulting in that the direction of relative displacement between the shaft-like member and the main body member of the load sensor is maintained substantially constant with high accuracy. In addition to this, even when the load is not applied, for example, upon non-operation of the operational member, the engagement between the positioning hole and the connecting pin maintains not only a constant orientation of the second member but also a constant orientation of the transmittal link connected to the second member via the connecting pin and the load sensor. Therefore, for example, any abnormal noise or the like resulted from by rocking movement of the transmittal link or the second member caused by vibration or the like in the vehicle running can be prevented.

In the fifth aspect of the present invention, the second member is the reaction force member, and the load sensor detects the operating force which is transmitted to the reaction force member. Accordingly, for example, brake force or the like, when a hydraulic brake or the like is mechanically actuated via the reaction force member, can be detected with high accuracy.

In the seventh aspect of the present invention, the main body member is pivotably arranged in a sensor accommodating hole penetrating the second member, which constructs the apparatus compact. In addition, the pair of transmittal links are arranged on both side surfaces of the plate-shaped second member and are integrally secured to both ends of the shaft-like member. Further, the connecting pin is connected to the pair of transmittal links bridging the transmittal links.

With this structure, the load is substantially uniformly applied to the load sensor in the axial direction thereof to relatively displace the main body member and the shaft-like member in parallel to the radial direction. As a result, suppression of the rotational moment such as torsion operates the load sensor stably, so that the detection accuracy of operating force is further improved.

In the eighth aspect of the present invention, the main body member of the load sensor is pivotably arranged in the second member, and the transmittal link is integrally secured to the shaft-like member, a sensor pin is arranged in the shaft-like member to be inserted along the axis thereof. The first member has a positioning hole which is arranged, in the front view as viewed in the axial direction, to be located at the position corresponding to the sensor pin and to be in parallel to the acting line of the load. The positioning hole is engaged with the sensor pin to determine the orientation of the first member provided with the positioning hole and the transmittal link.

With this structure, the transmittal link is mechanically and reliably pivoted with the movable operation of the operational member, resulting in that the direction of relative displacement between the shaft-like member and the main body member of the load sensor is maintained substantially constant with high accuracy. In addition to this, even when the load is not applied, for example, upon non-operation of the operational member, the engagement between the positioning hole and the sensor pin maintains the constant orientation of the first member. Also, since the orientation of the transmittal link connected to the first member by the connecting pin is made constant, any abnormal noise the like resulted from rocking movement of the transmittal link or the first member caused by vibration or the like in the running operation of the vehicle can be prevented.

In the ninth aspect of the present invention, the first member is the reaction force member, and the load sensor detects the operating force which is transmitted to the reaction force member. Accordingly, for example, brake force or the like, when a hydraulic brake or the like is mechanically actuated via the reaction force member, can be detected with high accuracy.

BEST MODE FOR CARRYING OUT THE INVENTION

The present invention is advantageously applied to a brake pedal apparatus for a service brake. However, the present invention can be applied to operating pedal apparatus for an accelerator or a parking brake. Also, the present invention can be applied to various types of operating apparatuses such as an operating pedal apparatus other than for use in vehicles, or an operating apparatus which is manually operated. For example, the reaction force member can be an operating rod of a brake booster, a push rod of a brake master cylinder or the like, constructed to mechanically operate a wheel brake or the like. Note that the present invention can be applied to an electrical (by-wire type) brake operating apparatus which electrically controls a wheel brake, a driving apparatus or the like in accordance with an operating force which is detected by the load sensor. In this case, a stroke simulator, a reaction force mechanism or the like can be connected to the reaction force member to be applied a given reaction force.

As the pivotal connecting portion in which the load sensor is provided, a connecting portion connecting the operational member such as an operational pedal to the reaction force member, or a connecting portion connecting the intermediate lever to the reaction force member is advantageously adopted.

Note that, where the operating apparatus according to the present invention includes a connecting link connecting the operational member to the intermediate lever, either the connecting portion connecting the connecting link to the operational pedal, or the connecting portion which connects the connecting link to the intermediate lever can serve as the pivotal connecting portion. The load sensor can be arranged at a suitable position. It can be suitably specified which of the pair of members which are connected pivotably relative to each other in the pivotal connecting portion serve as the first member or the second member, in consideration of the arrangement of the load sensor and the transmittal link, and the like.

In the thirteenth aspect of the present invention, the deformable member has a cylindrical shape one end and other end of which are integrally secured to the main body member and the shaft-like member respectively, so that the strain detecting element detects the shear strain generated in the deformable member upon the relative displacement thereof.

Note that a casing member can be integrally secured to a part of the deformable member which centers on the center line of the cylindrical deformable member, and the shaft-like member can be arranged to pass through the interior of the cylindrical shape of the deformable member. Thus, the reaction force displaces the main body member relative to the shaft-like member. In addition to such arrangement, the strain detecting element may detect the tensile strain which is generated in the deformable member.

The deformable member can have any of suitable shapes. For example, the deformable member can have an oval shape or the like in which at least a part to be deformed by the relative displacement between the shaft-like member and the main body member has an arc shape. The deformable member is arranged so that, upon application of a tensile load or a compressive load to both ends of the arc of the arc shape, the arc part will be deformed so as to elongate or bend. In addition to this, the deformable member can have a doughnut shape which corresponds in shape to an annular space formed between the shaft-like member and the main body member, to be elongated, compressed or bent by the relative displacement between the shaft-like member and the main body member.

In the present invention, the load (operating force or reaction force) is applied from a substantially constant direction around the axis of the load sensor, and the direction of the relative displacement between the shaft-like member and the main body member is substantially constant. Accordingly, various types of deformable members which are deformed by the relative displacement can be used.

In theory, the direction of relative displacement between the shaft-like member and the main body member is maintained constant by the pivotal movement of the transmittal link. Note that the direction of relative displacement caused by the frictional resistance and dimensional variation of a pivotal part of each member, gravity of each member and so on may be deviated, which can be allowed to some extent. The main body member can be a cylindrical annular member or the like which is arranged concentrically in the outer peripheral side of the shaft-like member.

The load sensor electrically detects the strain of the deformable member which is elastically deformed by the strain detecting element. The load sensor converts the strain into a load, i.e., operating force based on a previously determined map, calculation formula or the like. Advantageous examples of the strain detecting element can be provided by a strain resistance element such as a thin-film and thick-film type semiconductor strain gages, a normal strain gage and the like. Note that a piezoelectric element and the like can be also used.

The load sensor is preferably arranged at substantially the same position as the plate-shaped first member or second member, in other words, to overlap the first member or second member in the plate thickness direction, as in the third aspect or seventh aspect of the present invention. However, the load sensor can also be arranged on the side surfaces of the first member or second member. When the first member and second member are composed of a pair of parallel plate-shaped members that are spaced at a predetermined interval away from each other and are integrally connected to each other, the load sensor can be arranged between the pair of plate-shaped members, for example. Also, various types of load sensor can be used.

In the second aspect of the present invention, the load sensor rocks about the connecting pin integrally with the transmittal link. Accordingly, in order to allow the load sensor to rock, the first member has a sensor accommodating hole that has an arc shape or a linear shape centering on the connecting pin, for example. Note that a cut-off can be formed on the outer periphery of the first member, or the load sensor can be arranged to protrude outwardly from the first member.

In the sixth aspect of the present invention, the connecting pin rocks about the load sensor. Accordingly, in order to allow the connecting pin to rock, the second member has an elongated hole which has an arc shape or a linear shape centering on the center line of the load sensor, for example. Note that a cut-off can be formed on the outer periphery of the second member, or the connecting pin can be arranged to protrude outwardly from the second member.

In the third aspect of the present invention, the main body member of the load sensor is integrally secured to the transmittal link, and the shaft-like member is connected to the second member. For carrying out the second aspect of the present invention, the shaft-like member can be integrally secured to the transmittal link, and the main body member can be connected to the second member. Similarly, in the seventh aspect of the present invention, the shaft-like member of the load sensor is integrally secured to the transmittal link, and the main body member is connected to the second member to be pivotable relative thereto. For carrying out the sixth aspect of the present invention, the main body member can be integrally secured to the transmittal link, and the shaft-like member can be connected to the second member to be pivotable relative thereto.

In the third aspect of the present invention, the shaft-like member can be connected to the second member to be pivotable relative thereto, in consideration of assemble working and the like, but they may be secured integrally disabling relative pivotal movement therebetween. This is true for the case where the main body member is connected to the second member for carrying out the second aspect of the present invention.

In the seventh aspect of the present invention, the transmittal link can be pivatably connected to the first member via the connecting pin, in consideration of assembling working, but they may be secured integrally with relatively non-pivotable state.

In the third aspect of the present invention, the sensor pin is provided in the shaft-like member to be inserted along the axis thereof. Both ends of the sensor pin protrude from the main body member are connected to the second member. For example, the sensor pin is constructed as a separate member to be inserted into an insertion hole provided in the shaft-like member. However, the shaft-like member can be constructed so that both ends thereof protrude from the main body member to serve as the sensor pin, or pillar-shaped pin portions can be integrally formed on both end surfaces of the shaft-like body to protrude from both end surfaces for serving as the sensor pin. Various types of sensor pin sensors can be used. In the case where the sensor pin is constructed as a separate member from the shaft-like member, it can be pivotably arranged relative to the shaft-like member. However, the sensor pin may be integrally secured to the shaft-like member.

In the fourth aspect of the present invention, the second member has the positioning hole to be engaged with the connecting pin, which determines the orientation of the second member and the transmittal link. In the eighth aspect of the present invention, the first member has the positioning hole to be engaged with the sensor pin, which determines the orientation of the first member and the transmittal link. Note that when a predetermined load is applied to maintain the transmittal link or the like in the predetermined orientation even upon non-operation of the operational member, or when the rocking movement of the transmittal link or the like is allowable, determination of the orientation with the positioning holes of the first member and second member is not necessarily required.

BRIEF DESCRIPTION OF THE DRAWINGS

FIGS. 1A and 1B show an exemplary operating pedal apparatus for a vehicle service brake to which the present invention is applied, wherein FIG. 1A is a front view of the operating pedal apparatus, and FIG. 1B is an enlarged cross-sectional view taken along the line IA-IA in FIG. 1A;

FIGS. 3A and 3B show a load sensor according to the embodiment shown in FIG. 1, wherein FIG. 3A is a vertical cross-sectional view parallel to the center line O, and FIG. 3B is a cross-sectional view taken along the line IIIA-IIIA in FIG. 3A;

FIGS. 4A and 4B show the state where a deformable member is shear-deformed by the reaction force of an operating rod resulted from depression of the operational pedal from the state shown in FIGS. 3A and 3B, wherein FIG. 4A is a vertical cross-sectional view parallel to the center line O, and FIG. 4B is a cross-sectional view taken along the line IVA-IVA in FIG. 4A;

FIGS. 5A to 5C show detail of the deformable member, wherein FIG. 5A is an enlarged cross-sectional view of the deformable member shown in FIG. 4A, FIG. 5B is a plan view of the deformable member as viewed from an upper side in FIG. 5A, and FIG. 5C is a developed view of the deformable member to explain strain resistance elements that are arranged on the outer peripheral surface of the deformable member;

FIGS. 9A and 9B illustrate another embodiment according to the present invention, wherein FIG. 9A is a front view corresponding to FIG. 1A, and FIG. 9B is an enlarged cross-sectional view taken along the line IXA-IXA in FIG. 9A;

FIGS. 13A and 13B show the case where the present invention is applied to a vehicle operating pedal apparatus that has an intermediate lever, wherein FIG. 13A is a front view corresponding to FIG. 1A, and FIG. 13B is an enlarged cross-sectional view taken along the line XIIIA-XIIIA in FIG. 13A. The load sensor, the transmittal link and the like shown in FIGS. 1A and 1B are arranged in a pivotal connecting portion between the intermediate lever and a connection link;

FIGS. 14A and 14B illustrate another exemplary load sensor, wherein FIG. 14A is a vertical cross-sectional view parallel to the center line O, and FIG. 14B is a cross-sectional view taken along the line XIVA-XIVA in FIG. 14A. FIGS. 14A and 14B correspond to FIGS. 3A and 3B, respectively;

FIGS. 15A and 15B show the state where a deformable member is deformed so as to be elongated by the reaction force of an operating rod resulted from depression of the operational pedal from the state shown in FIGS. 14A and 14B, wherein FIG. 15A is a vertical cross-sectional view parallel to the center line O, and FIG. 15B is a cross-sectional view taken along the line XVA-XVA in FIG. 15A; and FIGS. 16A and 16B illustrate the background art in the present invention, wherein FIG. 16A is a front view of a vehicle operating pedal apparatus that has a load sensor, and FIG. 16B is an enlarged cross-sectional view taken along the line XVIA-XVIA in FIG. 16A.

PREFERRED EMBODIMENTS

In the following, embodiments of the present invention will be described with reference to the drawings.

Figure 1A:
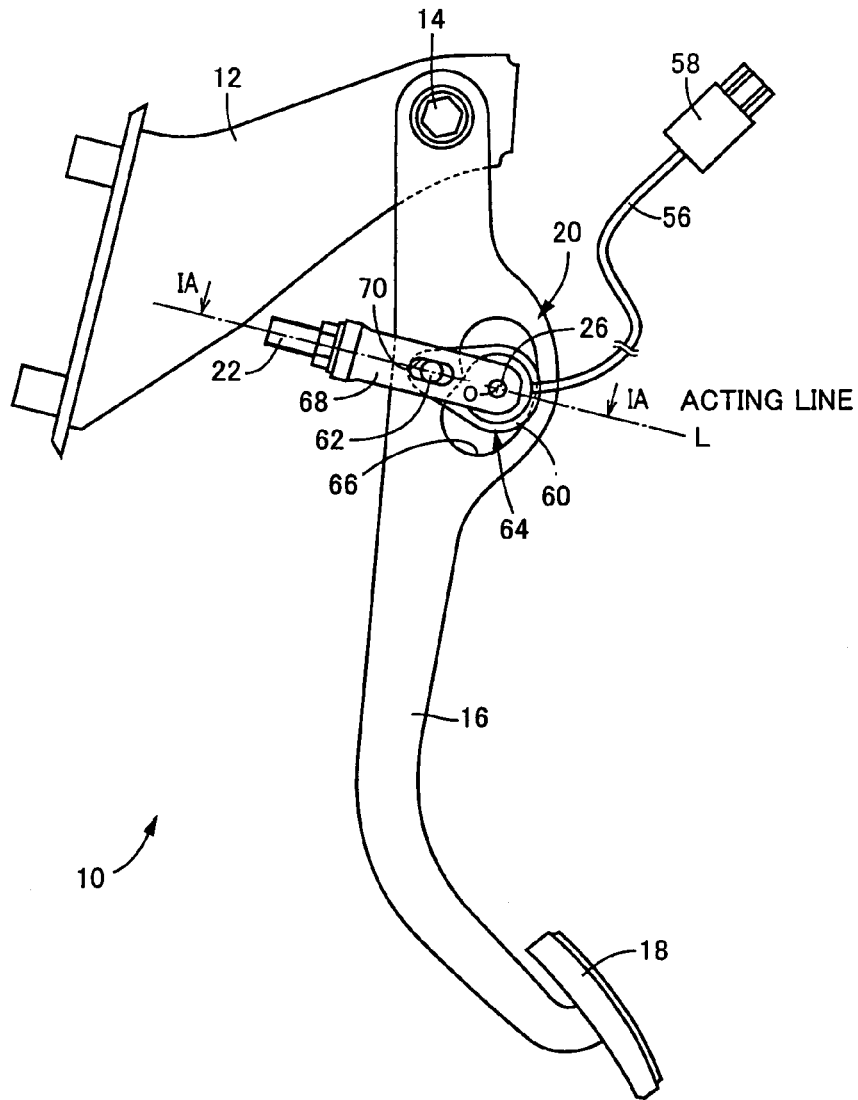
Figure 1B:
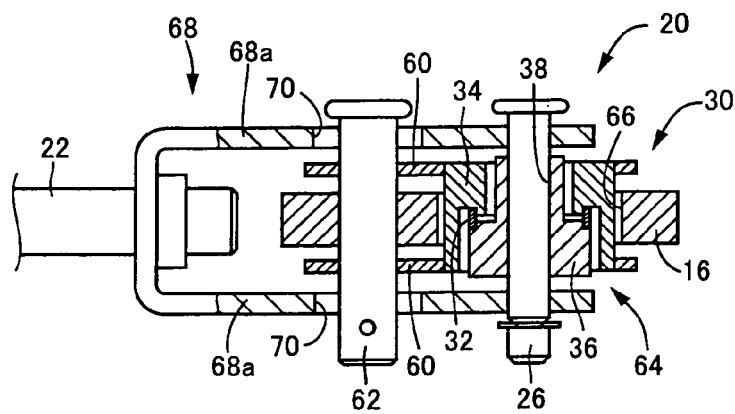
Figure 16A:
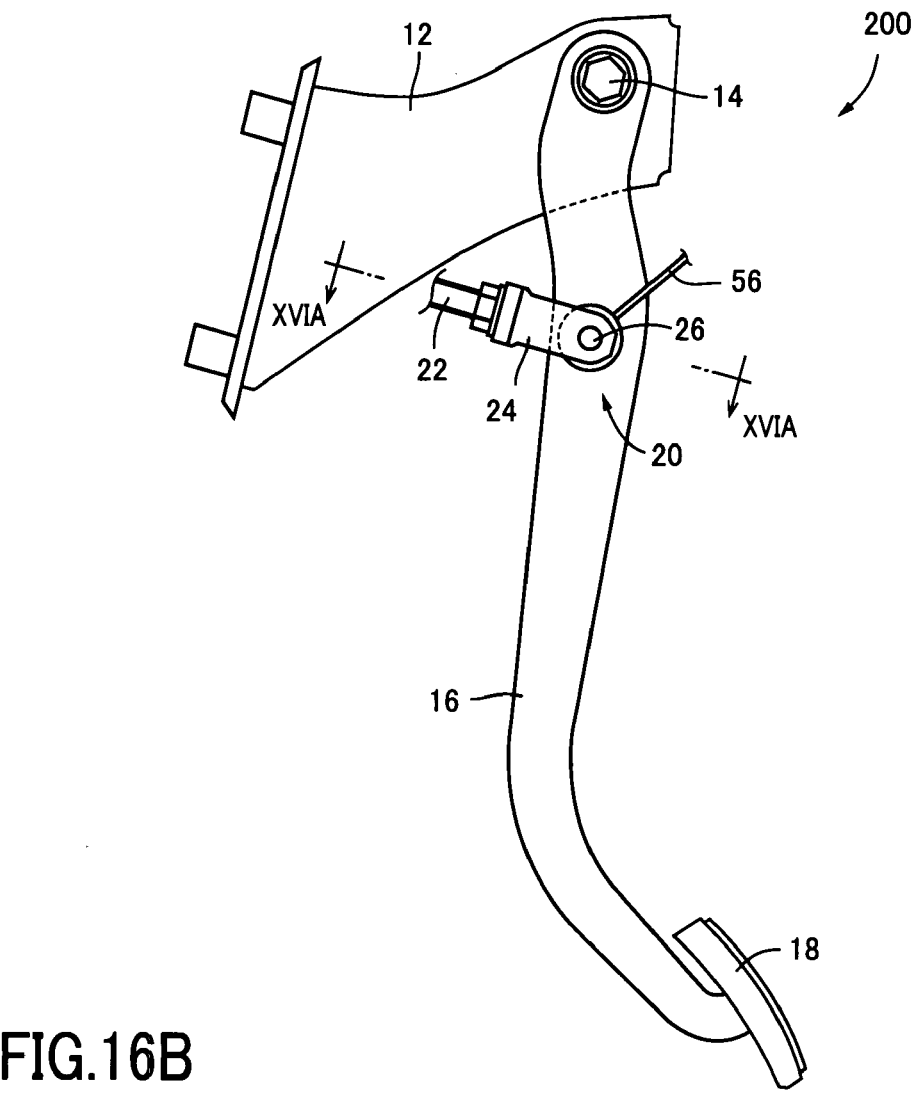
Figure 16B:
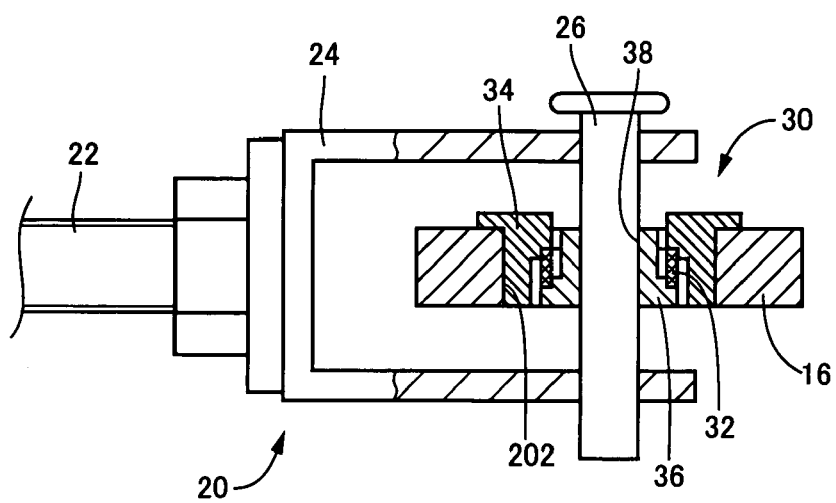

FIGS. 1A and 1B show an exemplary operating pedal apparatus 10 for a vehicle service brake according to one embodiment of the present invention. FIG. 1A is a front view of the operating pedal apparatus, and FIG. 1B is an enlarged cross-sectional view taken along the line IA-IA in FIG. 1A. The vehicle operating pedal apparatus 10 corresponds to a case where the present invention is applied to the aforementioned operating pedal apparatus 200 shown in FIG. 16. One end of each of the transmittal links 60 is connected to an operational pedal 16 via a connecting pin 62 so that the transmittal links 60 are pivotable relative to the operational pedal 16 about the connecting pin 62, which is in parallel to a support shaft 14. At the other end of each of the transmittal links 60, a load sensor 64 is arranged. A sensor accommodating hole 66, having an arc shape that centers on the connecting pin 62, is formed in the plate-shaped operational pedal 16 to penetrate it. The load sensor 64 is arranged in the sensor accommodating hole 66 with a predetermined clearance, and can rock in a predetermined angle range about the connecting pin 62.

The load sensor 64, having a structure similar to the aforementioned load sensor 30, includes a cylindrical deformable member 32, an annular member 34 as a claimed main body member, and a shaft-like member 36. The annular member 34 protrudes from both sides of the sensor accommodating hole 66. A pair of the transmittal links 60 arranged on both side surfaces of the operational pedal 16 are integrally secured to respective axial ends of the annular member 34 by a press-fit or the like. The connecting pin 62, passing through the operational pedal 16, is connected to the pair of transmittal links 60 on both sides of the operational pedal 16. A clevis pin 26 is inserted into an insertion hole 38 positioned on the axis of the shaft-like member 36 of the load sensor 64, to be relatively pivotable thereto. A clevis 68 is connected to both ends of the clevis pin 26 to be relatively pivotable thereto.

The clevis 68, corresponding to the aforementioned clevis 24, is longer than it to be integrally secured to an operating rod 22 by a screw, welding or the like. The clevis 68 includes a pair of parallel connecting plate portions 68a which are arranged outside the pair of transmittal links 60, and to which the clevis pin 26 is connected. The clevis pin 26 corresponds to a sensor pin. In this embodiment, the clevis pin 26 is constructed as a separate member separated from the shaft-like member 36, and is inserted into the insertion hole 38 to be relatively pivotable thereto. Note that the clevis pin can be constructed integrally with the shaft-like member 36.

Figure 2:
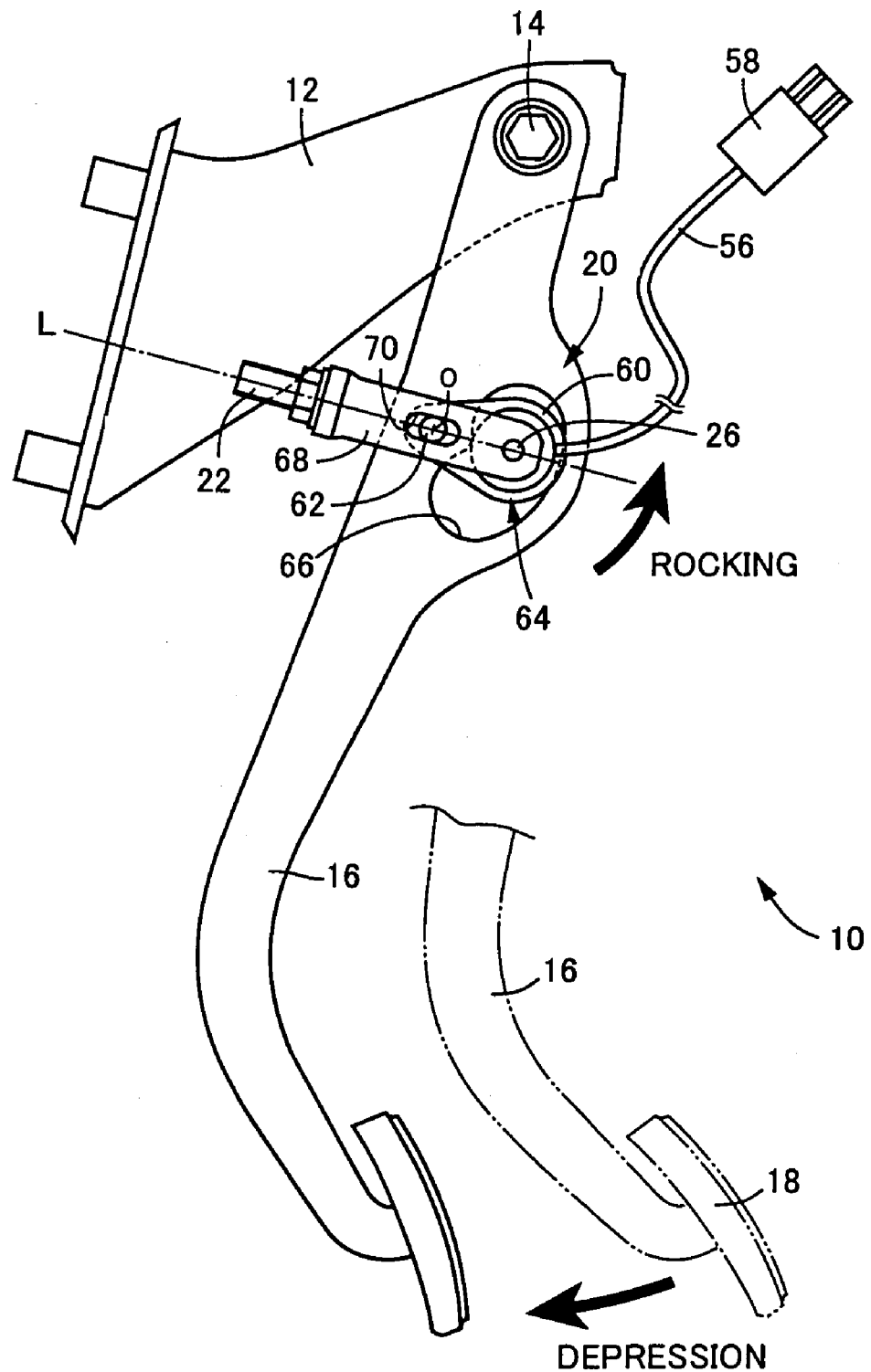
FIG. 2 is a front view showing the state where an operational pedal is depressed in the embodiment shown in FIGS. 1A and 1B.

In the front view as viewed from the center line O of the load sensor 64, that is in a state shown in FIG. 1A, the connecting pin 62 is arranged in the operational pedal 16 at a predetermined position on the acting line L of a load which is applied to the load sensor 64, when the operational pedal 16 is depressed. This predetermined position is the position where transmittal links 60 receive a tensile force, in other words, a position located closer to the operating rod 22 than the load sensor 64 in FIG. 1A. When the operational pedal 16 is depressed, as shown in FIG. 2, the operating rod 22 and the operational pedal 16 are relatively pivoted about the axis of the clevis pin 26. In the depressing operation, tensile force is applied to the transmittal links 60 by reaction force applied to the load sensor 64 from the operating rod 22 via the clevis pin 26. The tensile force pivots the transmittal links 60 counter-clockwise about the connecting pin 62 relative to the operational pedal 16. That is, the transmittal links 60 rock about the connecting pin 62 by the tensile force so that both the center lines O of the connecting pin 62 and the load sensor 64 are aligned on the acting line L of the load. As a result, the direction of relative displacement between the shaft-like member 36 and the annular member 34 of the load sensor 64 is maintained substantially constant, which maintains the deforming part of the deformable member 32 in substantially the same part thereof.

In this embodiment, the operational pedal 16 acting as a claimed operational member serves as a first member, and the operating rod 22 and the clevis 68 acting as a claimed reaction force member serve as a second member. This embodiment corresponds to one mode according to the second aspect of the present invention. The acting line L of the load substantially aligns with the center line of the operating rod 22, and rocks upward and downward about the connecting point between the operating rod 22 and a brake booster.

Here, the clevis pin 26 can be pivoted relative to both the shaft-like member 36 and the clevis 68. However, the transmittal links 60 are pivoted about the connecting pin 62 with depression of the operational pedal 16. For this reason, the clevis pin 26, not basically pivotable relative to the shaft-like members 36 and the clevis 68, may be assembled them in the non-pivotable state.

The pair of connecting plate portions 68a of the clevis 68 have elongated positioning holes 70 therein. In the front view as viewed from the center line O of the load sensor 64, that is in the state shown in FIG. 1A, the positioning holes 70 are formed at positions that align with the connecting pin 62 on the acting line L of the load applied to the load sensor 64 with depression of the operational pedal 16. The positioning holes 70 extend in parallel to the acting line L of the load. The connecting pin 62 is inserted into the positioning holes 70, and positions the orientation of the operating rod 22 is determined or positioned so that the positioning holes 70 are constantly located on the acting line L of the load. Also, the orientation of the transmittal links 60 which is connected to the operating rod 22 via the clevis pin 26 and the load sensor 64 is also positioned.

Accordingly, the transmittal links 60 are mechanically and forcedly pivoted about the connecting pin 62 so that both the center lines O of the connecting pin 62 and the load sensor 64 are located on the acting line L of the load. Therefore, the direction of relative displacement between the shaft-like member 36 and the annular member 34 of the load sensor 64 is maintained substantially constant with higher accuracy. In addition to this, even when the load is not applied, for example, upon non-operation of the operational pedal 16, any abnormal noise or the like generated by rocking movement of the operating rod 22 or the transmittal links 60 caused by vibration or the like in the vehicle running can be prevented. This results from that the engagement between the positioning holes 70 and the connecting pin 62 determines the orientation of the operating rod 22 and the transmittal links 60.

Figure 3A:
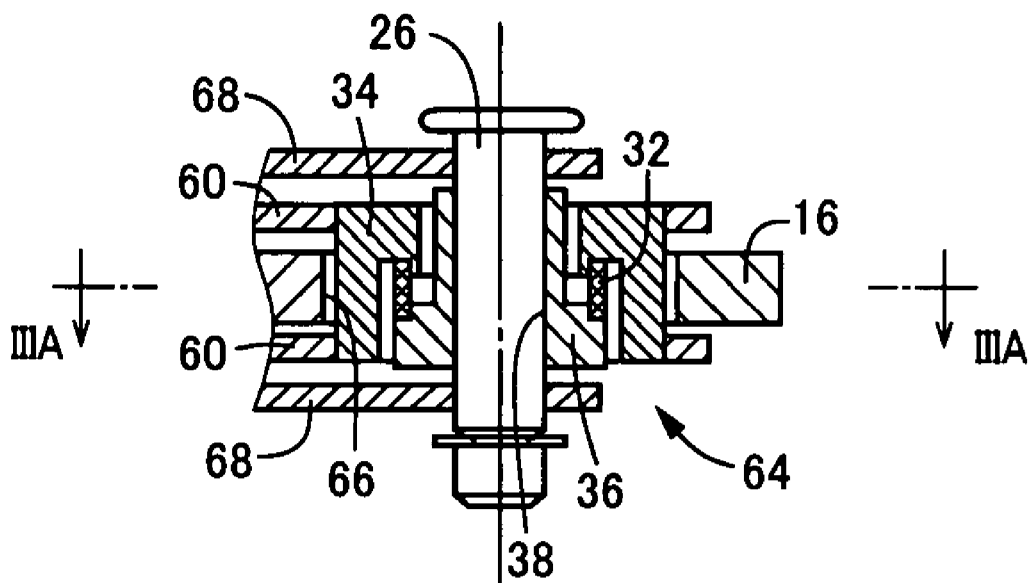
Figure 3B:
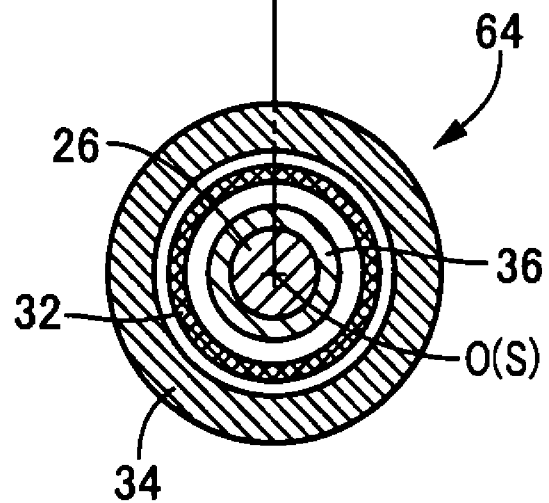
Figure 4A:
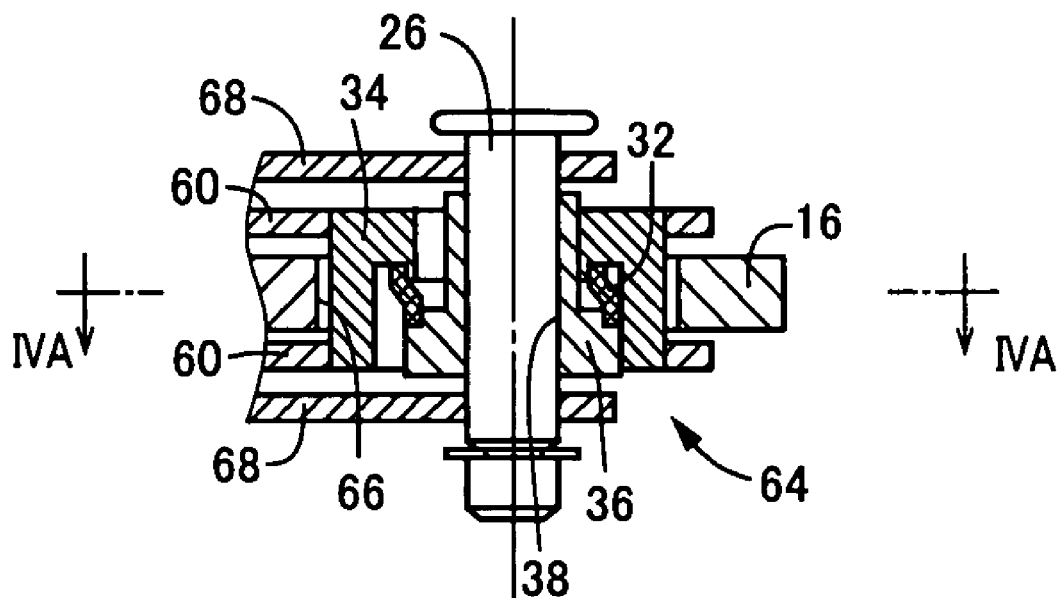
Figure 4B:
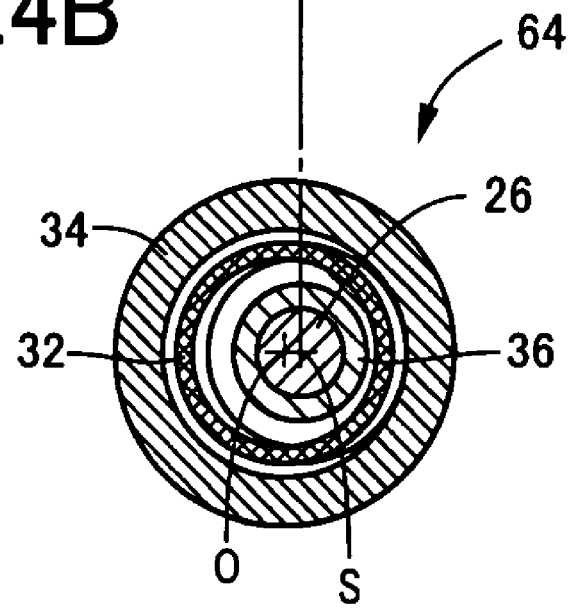

FIG. 3A is a cross-sectional view showing the load sensor 64 shown in the front view (state shown in FIG. 1A) as viewed in a line connecting the connecting pin 62 and the clevis pin 26 (corresponding to the acting line L). FIG. 3B is a cross-sectional view taken along the line IIIA-IIIA in FIG. 3A. FIG. 4 shows the state where the deformable member 32 of the load sensor 64 is deformed upon depression of the operational pedal 16. FIGS. 4A and 4B correspond to the views in FIGS. 3A and 3B, respectively. FIG. 4B is a cross-sectional view taken along the line IVA-IVA in FIG. 4A.

The annular member 34 and the shaft-like member 36 of the load sensor 64 are connected together by the deformable member 32 as follows. When a substantially zero load is applied from the outside in the radial direction, i.e., in a direction perpendicular to the center line O, as shown in FIG. 3, the axes S of the shaft-like member 36 and the clevis pin 26 are maintained in the state to substantially align with the center line O of the load sensor 64. Thus, the deformable member 32 is maintained in a cylindrical shape that centers on the center line O over the whole length thereof. The centerline O of the load sensor 64 coincides with the center line of the annular member 34 which is the main body member.

When the reaction force of the operating rod 22 is applied to the shaft-like member 36 via the clevis pin 26 with depression of the operational pedal 16, the radial load is applied between the shaft-like member 36 and the annular member 34. Specifically, the load acts to move the shaft-like member 36 rightward in FIG. 3 (also substantially rightward in FIG. 1A), relative to the annular member 34. The deformable member 32 arranged between the shaft-like member 36 and the annular member 34 is shear-deformed as shown in FIG. 4.

Annular space is formed between the annular member 34 and the shaft-like member 36 to allow the radial displacement of the both members 34 and 36 relative thereto, and the shear deformation of the deformable member 32. The deformable member 32 is made of a metal material such as a ferritic stainless steel alloy that can be elastically deformed by a load which is radially applied thereto. Accordingly, when the operational pedal 16 is depressed, the deformable member 32 is shear-deformed in accordance with the operating force. Note that although the actual deforming amount of the deformable member 32 is extremely small and does not substantially affect a depressing stroke of the operational pedal 16, the deforming amount is exaggerated in these Figures for sake of clarity. The same applies to other Figures showing this type of deformation.

Figure 5A:
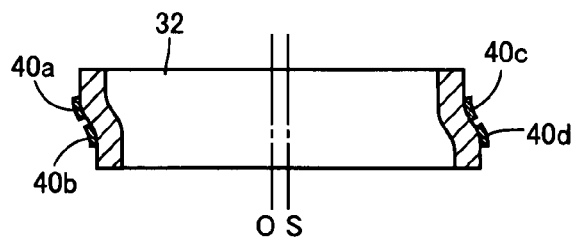
Figure 5B:
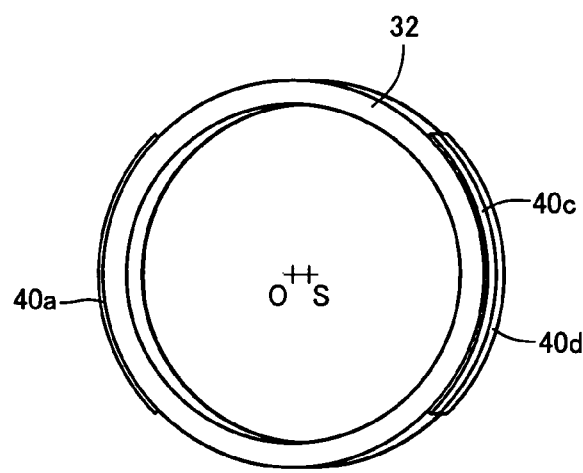
Figure 5C:
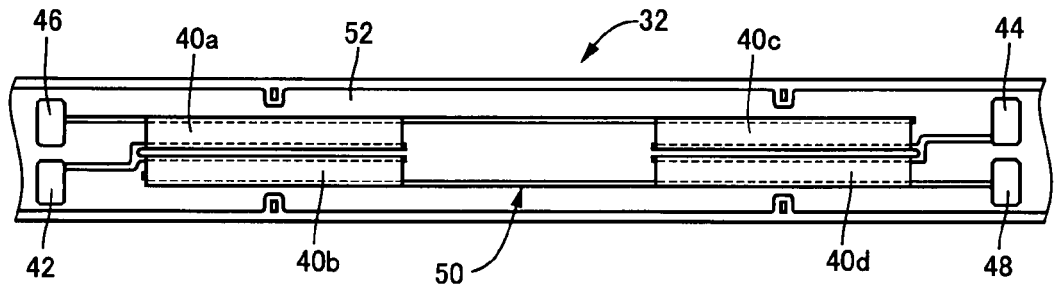

For detecting the shear strain of the deformable member 32, as shown in FIG. 5, four strain resistance elements 40a to 40d are attached on the outer peripheral surface of the deformable member 32 as the strain detecting elements. Advantageous examples of the strain resistance elements 40a to 40d can be provided by thin-film and thick-film type semiconductor strain gages, a normal strain gage and the like. FIG. 5A is a cross-sectional view corresponding to FIG. 4, and shows the state where the deformable member 32 is shear-deformed. FIG. 5B is a plan view of the deformable member 32 as viewed from the top side in FIG. 5A. FIG. 5C is a developed view of the outer peripheral surface of the deformable member 32. The four strain resistance elements 40a to 40d are arranged at two locations that are symmetric with respect to the center line O (S), in a direction in which the deformable member 32 will be shear-deformed by an external load. Two of the strain resistance elements are arranged at each of the two locations to be spaced away from each other in the axial direction. At each of the two locations, the two strain resistance elements are arranged at parts that will be deformed to be elongated or compressed.

In this embodiment, the acting direction of the load applied to the load sensor 64 by the rocking movement of the transmittal links 60 is maintained substantially constant. That is, the acting direction of the load is maintained constant in the right-and-left direction in FIGS. 1A, 3, 4, 5A and 5B. For this reason, the strain resistance elements 40*a* to 40*d* are not required to be particularly large. However, in view of the assembling working of the deformable member 32 and the like, each of the strain resistance elements 40*a* to 40*d* has length that covers an angle range of approximately 90° in the circumferential direction of the deformable member 32.

Figure 6:
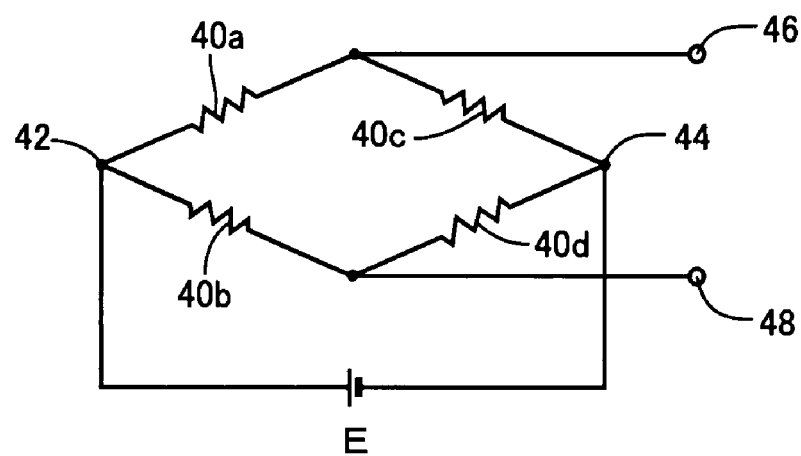
FIG. 6 is a circuit diagram showing a bridge circuit in which a conductive circuit pattern are connected to form the strain resistance element shown in FIG. 5C.

The strain resistance elements 40*a* to 40*d* are connected by a conductive circuit pattern 50 (see FIG. 5C) to form a bridge circuit shown in FIG. 6. A power supply E is connected between a power supply terminal 42 of the conductive circuit pattern 50, and the GND (grounding) terminal 44 to provide an electrical signal in accordance with the strain between a pair of output terminals 46 and 48. For connecting the power supply E to the power supply terminal 42 or for taking out the electrical signal provided from the output terminals 46 and 48, a wire harness 56 (see to FIG. 1) connected to the terminals extends from the load sensor 64 to be connected to a vehicle control circuit portion via a connector 58.

An insulating film 52 (see FIG. 5C) such as glass paste is previously formed on the outer peripheral surface of the deformable member 32, on which the conductive circuit pattern 50 made of a conductive material such as silver is formed. The strain resistance elements 40*a* to 40*d* are integrally formed by burning or the like to be in partial contact with the conductive circuit pattern 50. Note that a control circuit portion may be disposed inside the load sensor 64. Different from the full bridge circuit used in this embodiment, a half bridge circuit can be used, for example, when using deformable member which has a partial arc shape only in a part receiving the load of the operating force of the operational pedal 16.

In the vehicle operating pedal apparatus 10, the load sensor 64 that electrically detects the operating force based on the relative displacement between the annular member 34 and the shaft-like member 36 is arranged in the pivotal connecting portion 20 that connects the operational pedal 16 and the operating rod 22 in the relatively pivotable manner. The load sensor 64 detects the operating force which is transmitted via the clevis pin 26 in the pivotal connecting portion 20. Owing to arrangement of the load sensor 64 in the sensor accommodating hole 66 formed in the operational pedal 16, the operating pedal apparatus 10 can be made simple and compact as a whole, which does not affect on the installing condition of the conventional pedal apparatus.

On the other hand, the transmittal links 60 are connected to the operational pedal 16 to be relatively pivotable thereto by the connecting pin 62, and the annular member 34 of the load sensor 64 is integrally secured to the transmittal links 60. The shaft-like member 36 is connected to the operating rod 22 by the clevis pin 26. The connecting pin 62 is arranged on the acting line L of the load applied to the load sensor 64 at the position where the transmittal links 60 receive tensile force. Accordingly, when the operational pedal 16 is depressed, the transmittal links 60 are relatively pivoted about the connecting pin 62, so that the direction of relative displacement between the shaft-like member 36 and the annular member 34 of the load sensor 64 is maintained substantially constant. As a result, substantially the same part of the deformable member 32 is deformed to improve the detection accuracy of operating force, and variation in the detection accuracy is suppressed to provide high reliability.

In this embodiment, the connecting pin 62 penetrates the operational pedal 16, and the pair of transmittal links 60 arranged on both side surfaces of the operational pedal 16 are connected to both ends of the connecting pin 62. The load sensor 64 is arranged in the sensor accommodating hole 66 so that the annular member 34 protrudes from both side surfaces of the operational pedal 16. The pair of transmittal links 60 are integrally secured to both ends of the annular member 34. Also, the clevis 68 is connected to both ends of the clevis pin 26 inserted along the axis S of the shaft-like member 36. Accordingly, the load (operating force or reaction force) is substantially uniformly applied to the load sensor 64 in the axial direction, so that the annular member 34 and the shaft-like member 36 relatively displaces in parallel in the radial direction. As a result, owing to suppressed rotational moment such as torsion, the load sensor 64 operates stably, which renders the further improved detection accuracy of operating force.

In the front view as viewed in the axial direction of the load sensor 64, the clevis 68 is provided with the positioning holes 70 at positions that align with the connecting pin 62 on the acting line L of the load applied to the load sensor 64 in parallel thereto, when the operational pedal 16 is depressed. The positioning holes 70 engage with the connecting pin 62. Accordingly, the transmittal links 60 are mechanically and reliably pivoted about the connecting pin 62 with depression of the operational pedal 16, so that the direction of relative displacement between the shaft-like member 36 and the annular member 34 of the load sensor 64 is maintained constant with higher accuracy. In addition, even when a load is not applied, for example, upon non-operation of the operational pedal, engagement between the positioning holes 70 and the connecting pin 62 maintains the constant orientation of the operating rod 22. Also, the transmittal links 60 connected to the operating rod 22 via the clevis pin 26 and the load sensor 64 are also positioned at a constant orientation, any abnormal noise or the like generated by rocking movement of the transmittal link 60 or the operating rod 22 caused by vibration or the like in the vehicle running can be prevented.

In this embodiment, the load sensor 64 is arranged in the pivotal connecting portion 20 that connects the operating rod 22 and the operational pedal 16 pivotably relative to each other to detect the final operating force (output) transmitted from the clevis pin 26 to the operating rod 22. Therefore, the load sensor 64 detects the brake force generated in accordance with the output of the operating rod 22 with higher accuracy.

Other embodiments according to the present invention are now described. Note that, in the following embodiments, components substantially the same as those of the aforementioned embodiment are given the same reference numerals and their description is omitted.

Figure 7:
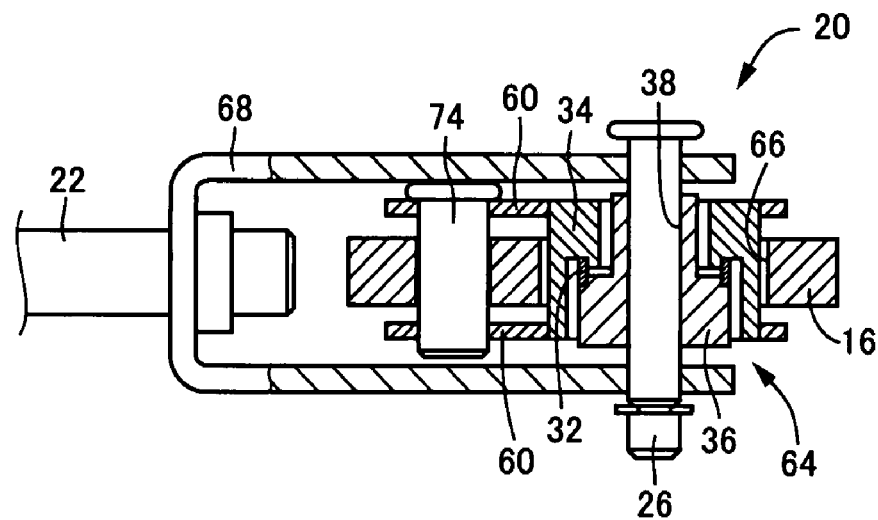
FIG. 7 is a sectional view showing another embodiment, corresponding to FIG. 1B, in which a connecting pin is too short to engage with a clevis.

FIG. 7 is a sectional view corresponding to FIG. 1B. This embodiment differs form the aforementioned embodiment shown in FIG. 1 in that a connecting pin 74 with a shorter length is used, instead of the connecting pin 62. No positioning holes 70 are formed in a pair of connecting plate portions of the clevis 68, and the connecting pin 74 does not engage with the clevis 68. Accordingly, the operating rod 22 and the transmittal links 60 can be relatively pivoted about the clevis pin 26. For this reason, when no load is applied, for example, upon non-operation of the operational pedal 16, the transmittal links 60 may rock about the connecting pin 74.

However, in this embodiment, even upon non-operation of the operational pedal 16, the operating rod 22 is biased rightward in FIG. 1A by the action of a return spring or the like (not shown), so that the operational pedal 16 contacts a stopper (not shown) to be positioned at an initial position. Accordingly, a predetermined load is applied between the operating rod 22 and the operational pedal 16 to maintain the operating rod 22 and the transmittal links 60 at the constant orientation shown in FIG. 1A.

Figure 8:
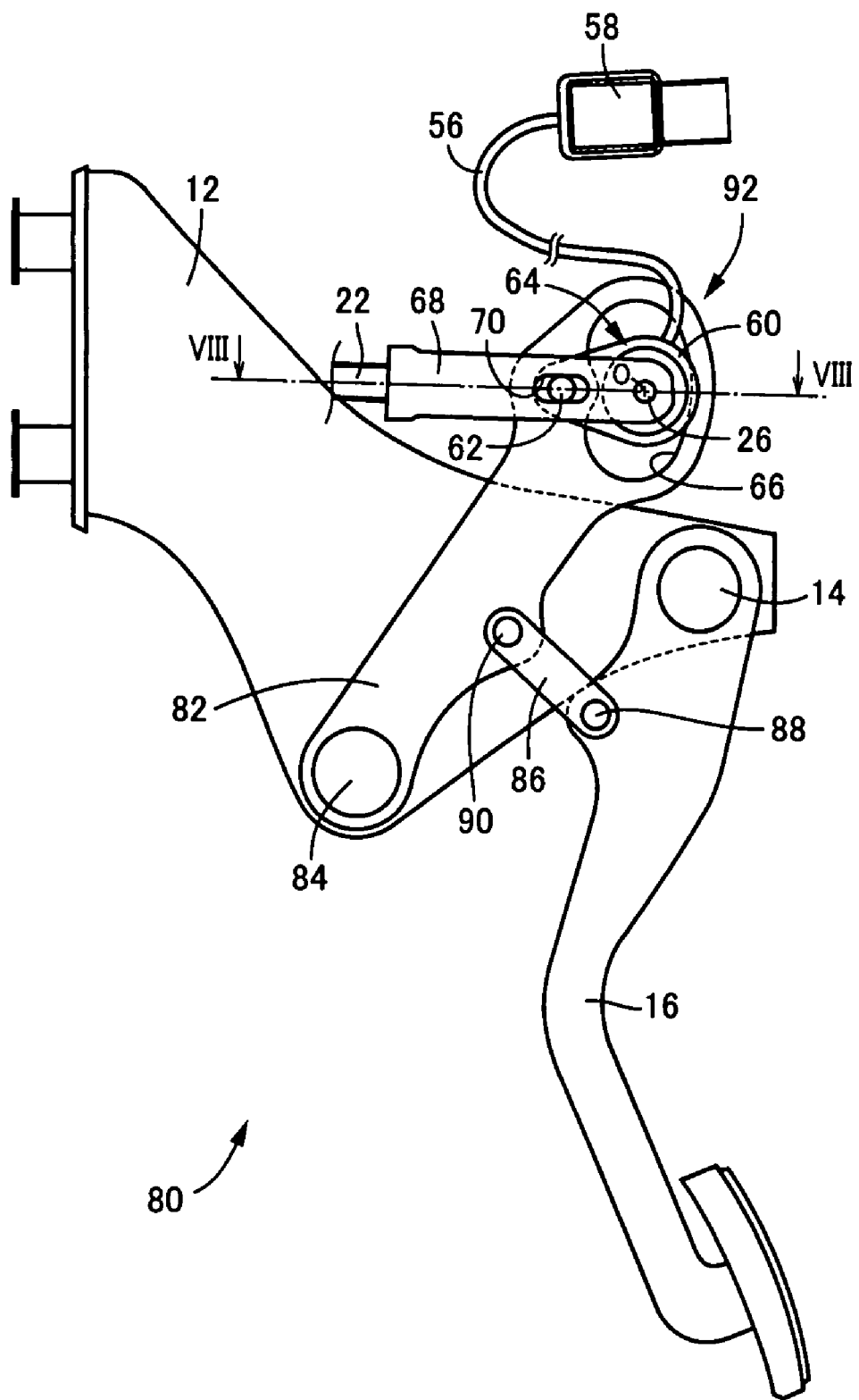
FIG. 8 is a front view, corresponding to FIG. 1A, showing the case where the present invention is applied to a vehicle operating pedal apparatus that has an intermediate lever, wherein the load sensor, a transmittal link and the like shown in FIGS. 1A and 1B are arranged in a pivotal connecting portion between the intermediate lever and an operating rod.

In a vehicle operating pedal apparatus 80 according to an embodiment shown in FIG. 8, operating force is transmitted to the operating rod 22 from the operational pedal 16 via an intermediate lever 82 which is additionally included. The intermediate lever 82 is pivotably connected to a pedal support 12 by a support pin 84 parallel to the support shaft 14. Also, the intermediate lever 82 is connected to the operational pedal 16 by the connection links 86, and is mechanically pivoted about the support pin 84 with a depressing operation of the operational pedal 16. Both ends of each connection link 86 are connected to the operational pedal 16 and the intermediate lever 82 relatively pivotably thereto by a pair of link pins 88 and 90 parallel to the support shaft 14.

The operating rod 22 is connected to a top end of the intermediate lever 82 by a pivotal connecting portion 92 which is constructed similar to the pivotal connecting portion 20 according to the embodiment shown in FIG. 1. The load sensor 64 is accommodated in the sensor accommodating hole 66 which is formed in the intermediate lever 82 to be rockable about the center line of the connecting pin 62. The load sensor 64 is connected to bridge the transmittal links 60 pivotably connected to the intermediate lever 82 by the connecting pin 62 and the clevis pin 26. Accordingly, this embodiment provides operations and effects similar to the aforementioned embodiment. Note that a cross-sectional view taken along the line VIII-VIII in FIG. 8 is the same as the case where the operational pedal 16 is substituted by the intermediate lever 82 in FIG. 1B corresponding to the claimed first member.

Figure 9A:
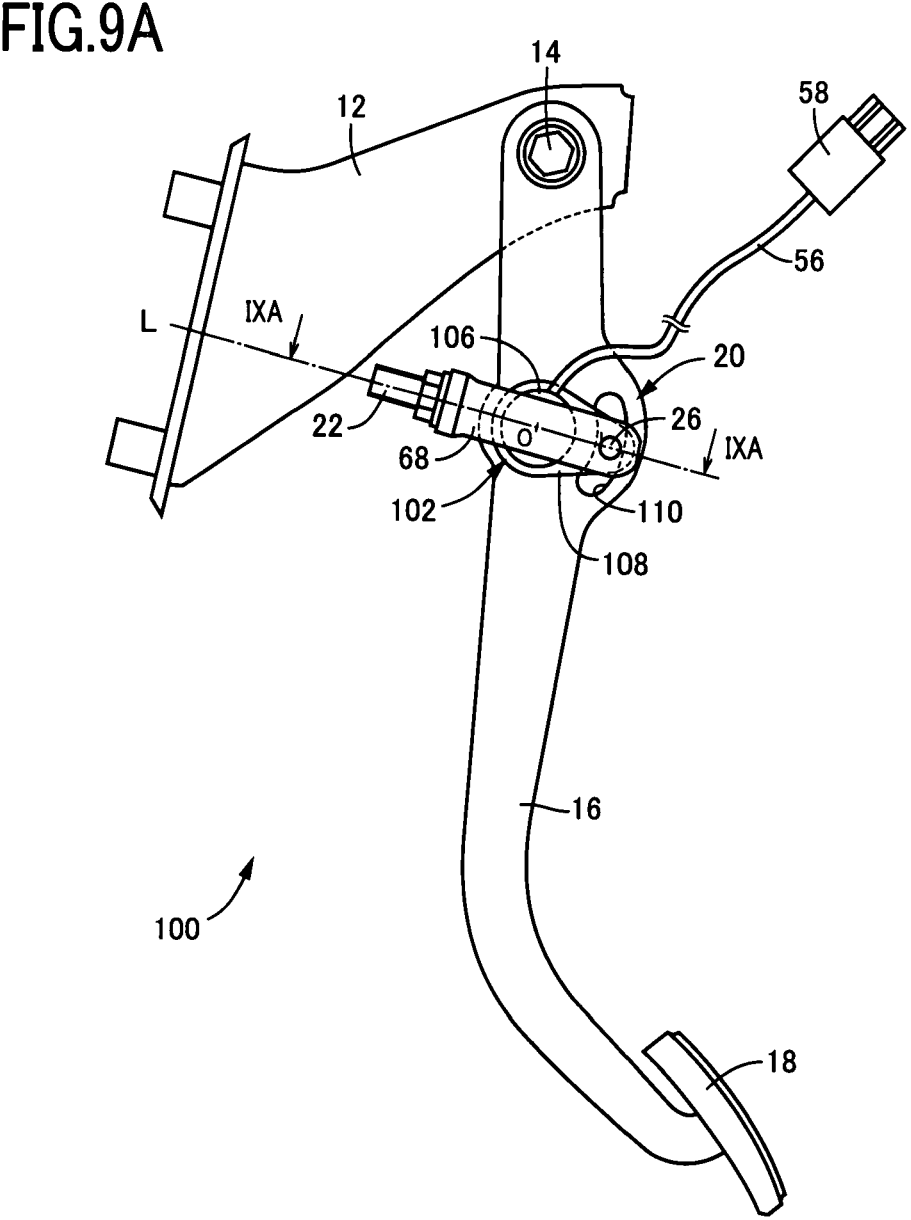
Figure 9B:
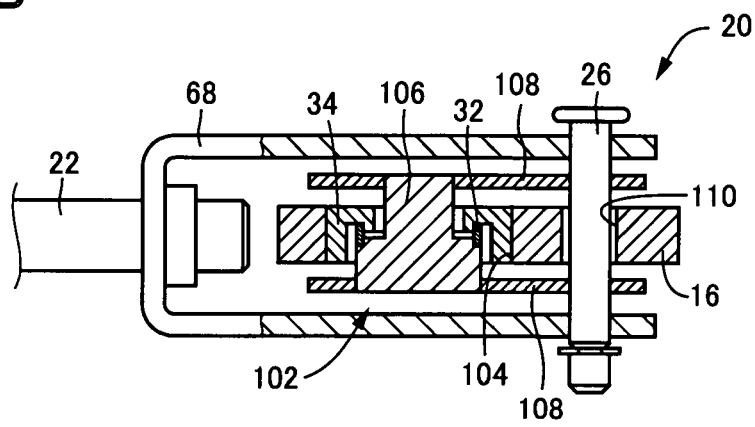

In a vehicle operating pedal apparatus 100 shown in FIG. 9, similar to the aforementioned vehicle operating pedal apparatus 10 shown in FIG. 1, a load sensor 102 is arranged in the pivotal connecting portion 20 that connects the operational pedal 16 and the operating rod 22 pivotably relative to each other. However, in this load sensor 102, the annular member 34 is arranged in a sensor accommodating hole 104 penetrating the operational pedal 16 to be pivotable relative thereto about the center line O. Also, a pair of transmittal links 108 are integrally secured to both ends of a shaft-like member 106 arranged to protrude from both axial end surfaces of the annular member 34 by a press-fit or the like. The clevis 68 is connected to the top ends of the transmittal links 108 to be pivotable relative thereto by the clevis pin 26. Also, the clevis pin 26 is inserted into an arc-shaped elongated hole 110 having an arc shape centering on the center line O of the load sensor 102, formed in the operational pedal 16, and can rock about the center line O together with the transmittal links 108. FIGS. 9A and 9B are views corresponding to FIGS. 1A and 1B respectively, wherein FIG. 9A is a front view, and FIG. 9B is an enlarged cross-sectional view taken along the line IXA-IXA in FIG. 9A.

Figure 10:
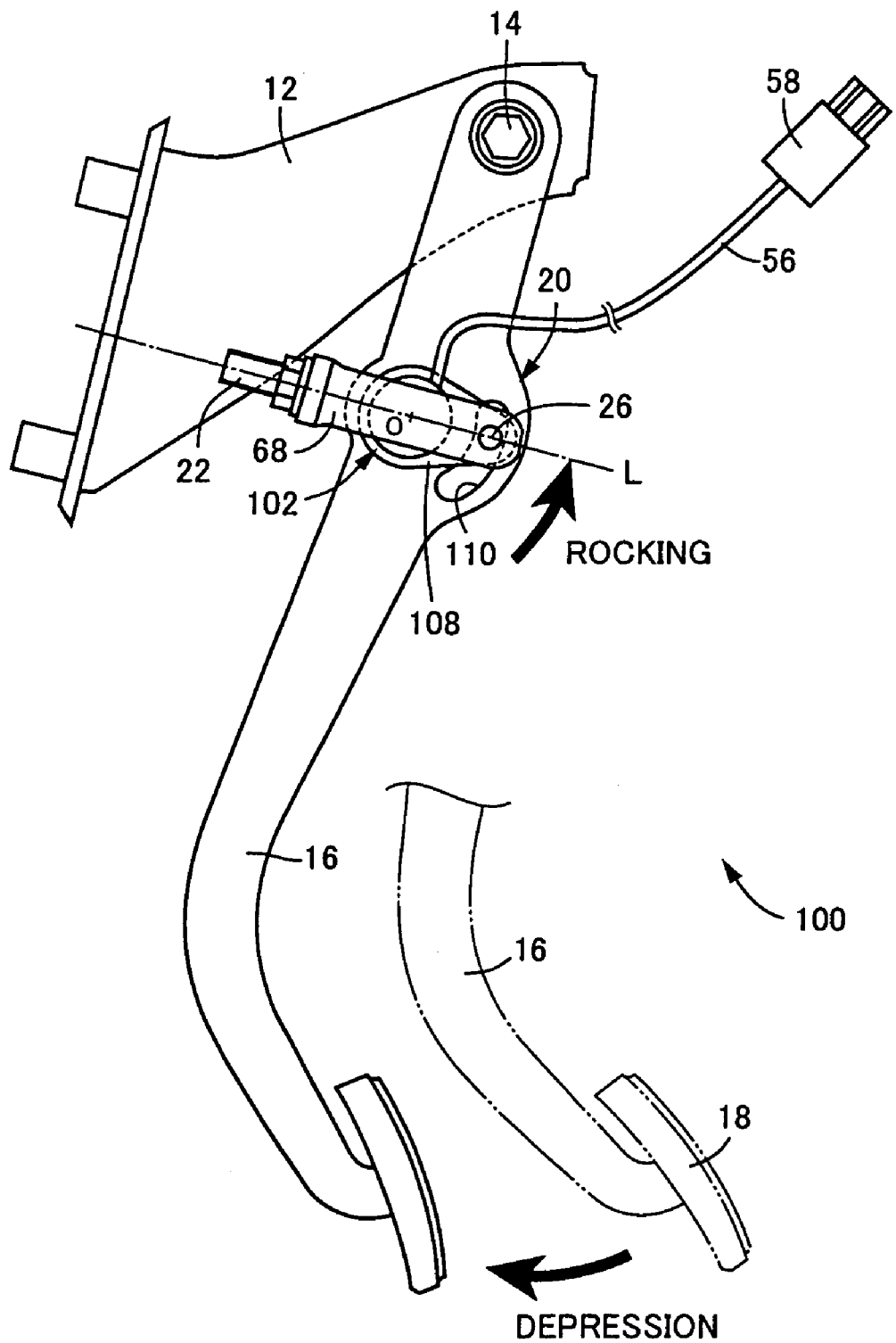
FIG. 10 is a front view showing the state where an operational pedal is depressed in the embodiment shown in FIGS. 9A and 9B.

The clevis pin 26 is connected to the clevis 68 in the following manner. That is, in the front view as viewed in the center line O of the load sensor 102, that is in the state shown in FIG. 1A, the connecting position is located, on the acting line L of the load which is applied to the load sensor 102, at the position generating the tensile force in the transmittal links 108, with depression of the operational pedal 16. This connecting position generating the tensile force is arranged, in FIG. 9A, at the side opposite to the operating rod 22 with respect to the load sensor 102. When the operational pedal 16 is depressed, as shown in FIG. 10, the operating rod 22 and the operational pedal 16 are relatively pivoted about the axis of the clevis pin 26. Here, the reaction force applied to the clevis pin 26 from the operating rod 22 is applied to the transmittal link 108 as the tensile force, so that the transmittal links 108 are pivoted counterclockwise about the center line O of the load sensor 102 in relation to the operational pedal 16. That is, the transmittal links 108 are rocked about the center line O by the tensile force so that both the center lines of the clevis pin 26 and the load sensor 102 position on the acting line L of the load.

Thus, the direction of the relative displacement between the shaft-like member 106 and the annular member 34 of the load sensor 102 is maintained substantially constant, which maintains the deforming part of the deformable member 32 substantially constant. In the present embodiment, the clevis pin 26 functions as the connecting pin, the operating rod 22 and the clevis 68 constructing the reaction force member functions as the claimed first member, and the operational pedal 16 as the operational member functions as the claimed second member. As apparent, this embodiment corresponds to one embodiment of the sixth aspect of the present invention.

In the vehicle operating pedal apparatus 100, the load sensor 102 electrically detects the operating force of the operational pedal 16 based on the relative displacement between the annular member 34 and the shaft-like member 106. The load sensor 102 is arranged in the pivotal connecting portion 20 that connects the operational pedal 16 to the operating rod 22 pivotably relative to each other to detect the operating force transmitted via the clevis pin 26. Since the load sensor 102 is arranged in the sensor accommodating hole 104 penetrating the operational pedal 16, the operating pedal apparatus 100 can be made simple and compact as a whole, which does not affect on the installing condition of the conventional pedal apparatus.

The transmittal links 108 are connected to the operating rod 22 by the clevis pin 26, and the shaft-like member 106 of the load sensor 102 is integrally secured to the transmittal links 108. Also, the annular member 34 is inserted into the sensor accommodating hole 104 formed in the operational pedal 16 to be pivotable about the center line O. The clevis pin 26 is arranged on the acting line L of the load applied to the load sensor 102, at the position generating tensile force in the transmittal links 108. Accordingly, when the transmittal links 108 are relatively pivoted integrally with the load sensor 102 about the center line O with depression of the operational pedal 16, the direction of relative displacement between the shaft-like member 106 and the annular member 34 of the load sensor 102 is maintained substantially constant. As a result, substantially the same part of the deformable member 32 is deformed to improve the detection accuracy of operating force, and variation in detection accuracy is suppressed to provide high reliability.

The annular member 34 of the load sensor 102 is arranged in the sensor accommodating hole 104 penetrating the operational pedal 16 to be pivotable about the center line O. The pair of transmittal links 108 arranged on both side surfaces of the operational pedal 16 are integrally secured to both axial ends of the shaft-like member 106, and are connected to both ends of the clevis pin 26 inserted into the elongated hole 110 penetrating the operational pedal 16. Accordingly, the load is substantially uniformly applied to the load sensor 102 in the axial direction, so that the annular member 34 and the shaft-like member 106 are relatively displaced in parallel in the radial direction. As a result, owing to the suppressed rotational moment such as torsion, the load sensor 102 operates stably to further improve the accuracy of detection of operating force.

In this embodiment, the load sensor 102 is arranged in the pivotal connecting portion 20 that connects the operating rod 22 and the operational pedal 16 pivotably relative to each other, to detect the final operating force (output) transmitted from the clevis pin 26 to the operating rod 22. Therefore, the brake force generated in accordance with the output of the operating rod 22 with high accuracy can be detected.

Figure 11:
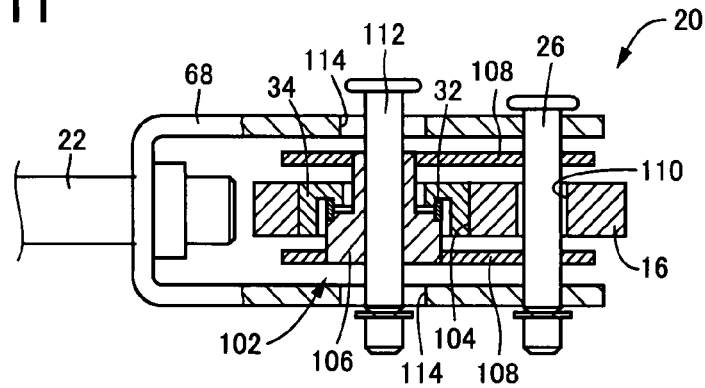
FIG. 11 is a sectional view illustrating, in the embodiment of FIGS. 9A and 9B, the case where a sensor pin arranged in a shaft-like member of a load sensor engages with an positioning hole formed in a clevis, and corresponds to FIG. 9B.

FIG. 11 is a cross-sectional view corresponding to FIG. 9B. This embodiment differs from the vehicle operating pedal apparatus 100 shown in FIG. 9, in that a sensor pin 112 is inserted into the shaft-like member 106 on the axis to be pivotable or non-pivotable relative to the shaft-like member 106. This sensor pin 112 protrudes toward both sides in the axial direction. Positioning holes 114 are formed in a pair of connecting plate portions of the clevis 68, similar to the positioning holes 70 according to the embodiment shown in FIG. 1. That is, in the front view shown in FIG. 9A, the center line of the operating rod 22 (same as the acting line L of the load) passes through the center line O of the load sensor 102. In this state, the elongated positioning holes 114, arranged in parallel to the center line of the operating rod 22 at positions aligning with the center line O of the load sensor 102. Irrespective of depression of the operational pedal 16, the engagement between the positioning holes 114 and the sensor pin 112 mechanically determines the orientation of the operating rod 22 and the transmittal links 108. Therefore, this embodiment provides the effects similar to the embodiment shown in FIG. 1.

Specifically, the transmittal links 108 are mechanically and reliably pivoted about the center line O of the load sensor 102 with depression of the operational pedal 16, so that the direction of relative displacement between the shaft-like member 106 and the annular member 34 of the load sensor 102 is maintained constant with higher accuracy. Even when the load is not applied, for example, upon non-operation of the operational pedal 16, the engagement between the positioning holes 114 and the sensor pin 112 maintains a constant orientation of the operating rod 22. Also, the transmittal links 108 connected to the operating rod 22 by the clevis pin 26 are also arranged at that constant orientation, so that any abnormal noise or the like generated by rocking movement of the transmittal links 108 or the operating rod 22 caused by vibration or the like in the vehicle running can be prevented.

Figure 12:
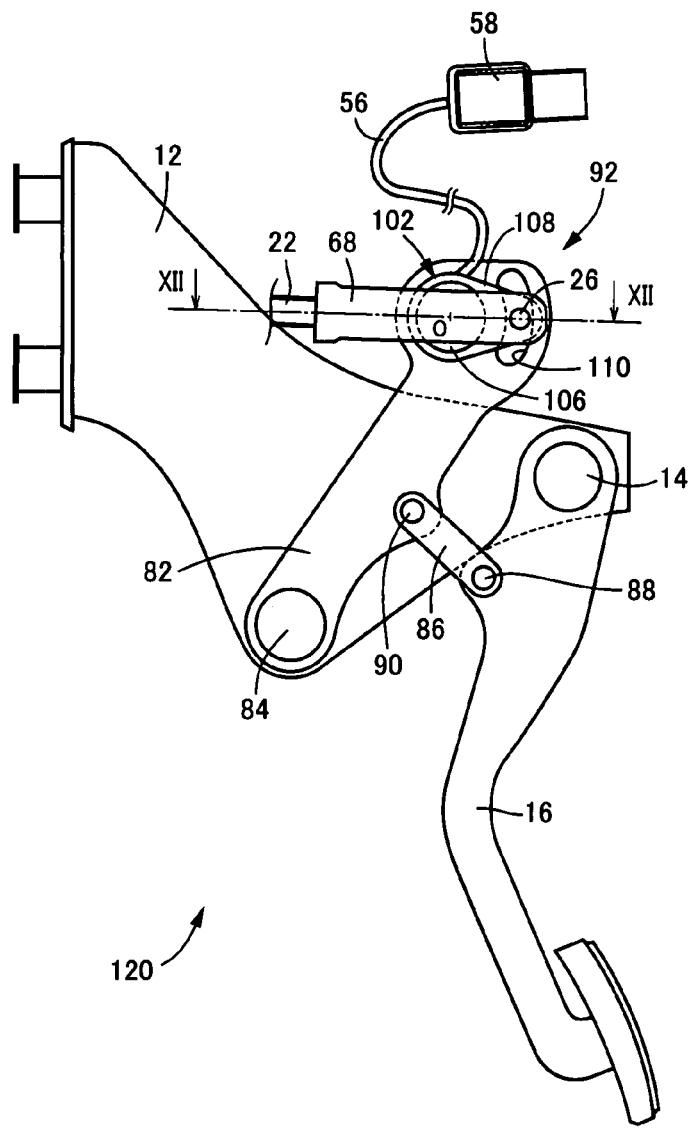
FIG. 12 is a front view, corresponds to FIG. 9A, showing the case where the present invention is applied to a vehicle operating pedal apparatus that has an intermediate lever, wherein a load sensor, a transmittal link and the like shown in FIGS. 9A and 9B are arranged in a pivotal connecting portion between the intermediate lever and an operating rod.

A vehicle operating pedal apparatus 120 shown in FIG. 12 includes the intermediate lever 82 similar to the vehicle operating pedal apparatus 80 shown in FIG. 8. The load sensor 102, the transmittal links 108 and the like are arranged at the pivotal connecting portion 92 that serves as a connecting portion between the intermediate lever 82 and the operating rod 22, similar to the embodiment shown in FIG. 9. That is, the transmittal links 108 are integrally secured to the shaft-like member 106 of the load sensor 102 which is pivotably disposed in the sensor accommodating holes 104 formed in the intermediate lever 82. The clevis 68 is connected to top ends of the transmittal links 108 via the clevis pin 26. The clevis pin 26 is inserted into an arc-shaped elongated hole 110, having an arc shape that centers on the center line O of the load sensor 102 and being formed in the intermediate lever 82, can rock about the center line O, that is can be displaced. Accordingly, this embodiment provides operations and effects similar to the embodiment shown in FIG. 9. Note that a cross-sectional view taken along the line XII-XII in FIG. 12 is the same as case where the operational pedal 16 is substituted by the intermediate lever 82 in FIG. 9B. The intermediate lever 82 corresponds to the claimed second member.

A vehicle operating pedal apparatus 130 shown in FIG. 13 differs from the aforementioned vehicle operating pedal apparatus 80 shown in FIG. 8, in that the arrangement of the load sensor 64, transmittal links 60 and the like. The load sensor 64 and the like are arranged in a pivotal connecting portion 132 that connects the connection links 86 to the intermediate lever 82 by the link pin 90. The pivotal connecting portion 132 is constructed similar to the pivotal connecting portion 20 shown in FIG. 1, or the pivotal connecting portion 92 shown in FIG. 8. The load sensor 64 is accommodated to be rockable in the sensor accommodating hole 66 formed in the intermediate lever 82. Also, the load sensor 64 bridges the transmittal links 60 pivotably connected to the intermediate lever 82 by the connecting pin 62 and the link pin 90.

Figure 13A:
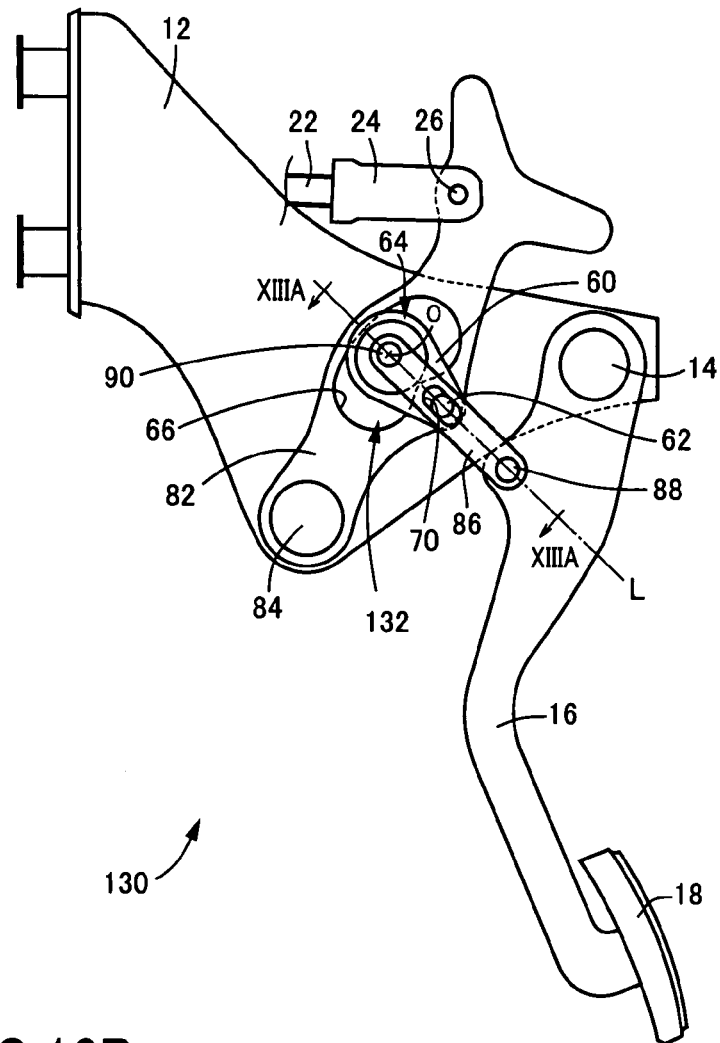
Figure 13B:
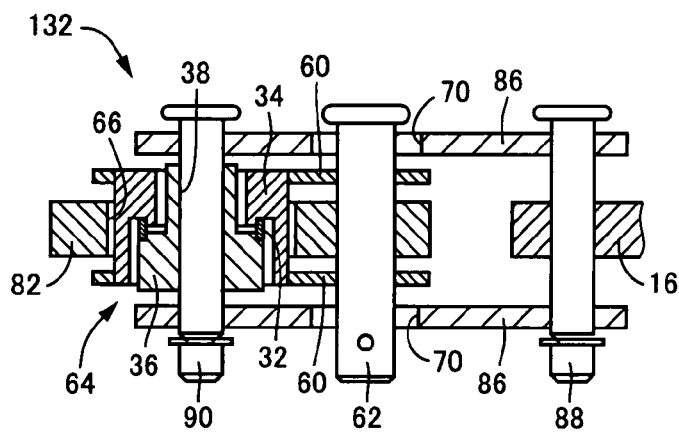

The positioning holes 70 are formed in the connection links 86 in the front view shown in FIG. 13A on the acting line L of the load, at positions that align with the connecting pin 62 in parallel to the acting line L. The engagement between the positioning holes 70 and the connecting pin 62 determines the orientation of the connection links 86 and the transmittal links 60. Accordingly, this embodiment provides operations and effects similar to the embodiments shown in FIGS. 1 and 8. FIGS. 13A and 13B are views corresponding to FIGS. 1A and 1B respectively, wherein FIG. 13A is a front view, and FIG. 13B is an enlarged cross-sectional view taken along the line XIIIA-XIIIA in FIG. 13A. In this embodiment, the intermediate lever 82 corresponds to the claimed first member, and the connection links 86 correspond to the claimed second member. This embodiment corresponds to one mode according to the second aspect of the present invention.

Note that the present invention can be applied to a pivotal connecting portion that connects the connection links 86 to the operational pedal 16 via the link pin 88 pivotably relative to each other so that a load applied to the link pin 88 is detected as operating force. Alternatively, similar to the embodiment shown in FIG. 9 or 12, the load sensor 102 can be connected pivotably about the center line O to the operational pedal 16 or the intermediate lever 82, and the transmittal links 108 integrally secured to the load sensor 102 can be connected to the connection links 86 by the link pin 88 or 90.

Figure 14A:
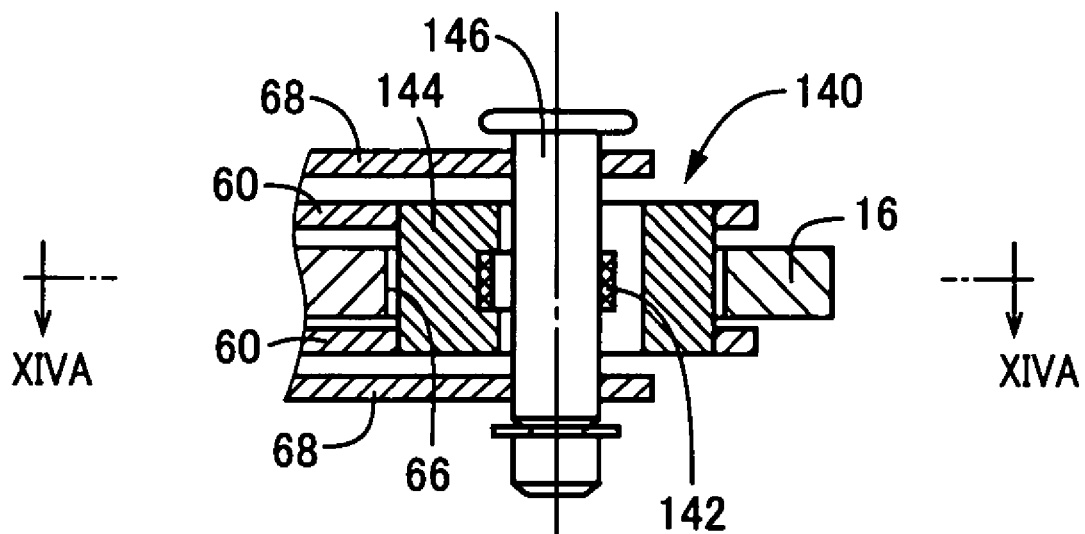
Figure 14B:
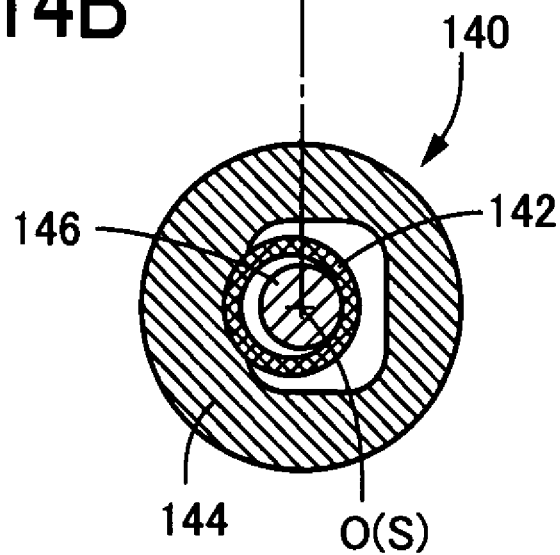
Figure 15A:
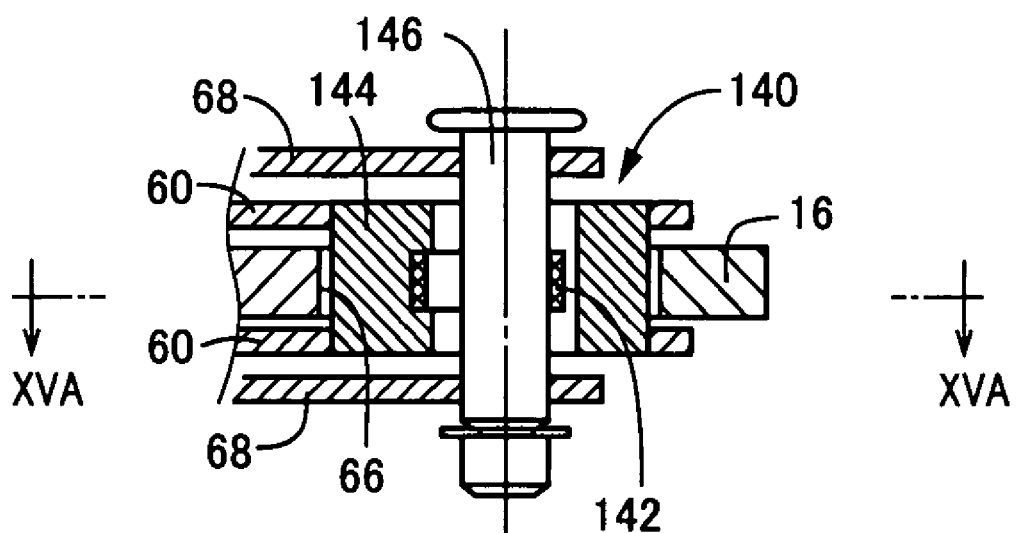
Figure 15B:
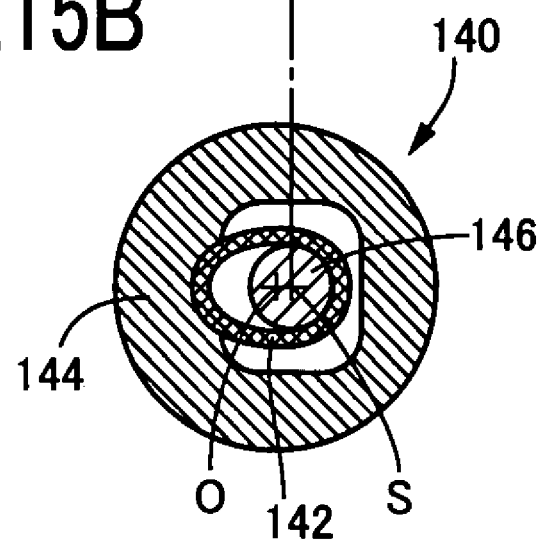

In the aforementioned embodiment shown in FIG. 1, a load sensor 140 shown in FIGS. 14 and 15 can be used instead of the load sensor 64. FIGS. 14 and 15 are cross-sectional views corresponding to FIGS. 3 and 4, respectively. FIGS. 14A and 15A are the vertical cross-sectional view parallel to the center line O. FIGS. 14B and 15B are cross-sectional views taken along the lines XIVA-XIVA and XVA-XVA in FIGS. 14A and 15A, respectively. The load sensor 140 includes a cylindrical deformable member 142 that detects a load applied in a radial direction thereof, and an annular member 144 arranged on the outer periphery of the deformable member 142. The annular member 144 is accommodated in the sensor accommodating hole 66, and is integrally secured to the transmittal links 60 by a press-fit or the like. A part of the periphery of the deformable member 142 about the center line (a side wall part located left in FIGS. 14 and 15) is integrally held on the inner peripheral surface of the annular member 144 by welding or the like. The shaft-like member 146 is inserted into an interior space of the cylindrical deformable member 142 to be connected at both ends thereof to the clevis 68. Note that the clevis pin 26 can be used for the shaft-like member 146.

When a substantially zero external load is applied, the load sensor 140 is held in a state shown in FIG. 14, that is, in the state where the annular member 144 is held substantially concentric with the axis S of the shaft-like member 146. The deformable member 142 is held in the eccentric state relative to the axis S of the shaft-like member 146 so that the inner peripheral surface of the side wall part of the deformable member 142 substantially contacts the shaft-like member 146 on the right side in FIG. 14. This contacting portion is located on the side opposite to the portion where the deformable member 142 is secured to the annular member 144. This is achieved by the action of a return spring or the like (not shown) that biases the operating rod 22 rightward in FIG. 1A so that the operational pedal 16 contacts a stopper (not shown) to be positioned at an initial position. In this state, the deformable member 142 has a cylindrical shape of substantially true circle.

On the other hand, with depression of the operational pedal 16, the load is applied in the radial direction between the annular member 144 and the shaft-like member 146 by the reaction force of the operating rod 22. Then, the shaft-like member 146 displaces rightward in FIGS. 14 and 15 relative to the annular member 144. Thus, the deformable member 142, being subjected to tension, is deformed into an elliptical shape as shown in FIG. 15. The annular member 144 is specified in the size of the annular interior space to allow the relative displacement between the annular member 144 and the shaft-like member 146, and the tensile deformation of the deformable member 142. The deformable member 142 is made of a metal material such as a ferritic stainless steel alloy that can be elastically deformed by being acted on by the load in a radial direction, and is tensile-deformed in accordance with the operating force with depression of the operational pedal 16.

For detecting the tensile strain of the deformable member 142, strain resistance elements acting as strain detecting elements are fastened on the side wall parts on the outer peripheral surface of the deformable member 142 that are located on the upper and lower areas in FIG. 15B, that is, on the parts generating the tensile strain. An insulating film such as glass paste is previously formed on the outer peripheral surface of the deformable member 142 similar to the aforementioned embodiments. The conductive circuit pattern formed of a conductive material such as silver, is formed on the insulating film. The strain resistance elements are integrally formed by burning or the like to be in partial contact with the conductive circuit pattern.

The size and arrangement of the strain resistance elements are suitably specified in consideration of assembling working and the like. In the present invention, the load is applied in the constant direction, irrespective of the depression amount of the operational pedal 16, resulting in deformation of the same part of deformable member 142. Therefore, even a relatively small strain resistance element can stably provide high detection accuracy.

Note that the load sensor 140 can be similarly used instead of the load sensor 64 or 102 in the other embodiments shown in FIG. 7 or later.

While preferred embodiments of the invention have been described with reference to the drawings, these embodiments are only illustrative. It will be apparent to those skilled in the art that various changes and modifications can be made without departing from the spirit or scope of the present invention.

What is claimed:

1. A load sensor-equipped operating apparatus, comprising:
    an operational member which is movably operated;
    a reaction force member which receives an operating force of the operational member transmitted thereto, and on which a reaction force corresponding to the operating force is acted;
    at least one pivotal connecting portion which is interposed between the operational member and the reaction force member, and pivotably connects a pair of a first member and a second member relative to each other to transmit the operating force; and
    a load sensor which electrically detects the operating force, wherein
    the load sensor includes a shaft-like member, a main body member disposed to be relatively displaced in a direction perpendicular to an axis of the shaft-like member, a deformable member bridging the shaft-like member and the main body member, and a strain detecting element which is secured to the deformable member, and the shaft-like member and the main body member are relatively displaced by the reaction force in the direction perpendicular to the axis of the shaft-like member to deform the deformable member so that the strain detecting element detects the deformation of the deformable member;
    a transmittal link, one end of which is connected to the first member by a connecting pin, and other end of which is integrally secured to one of the shaft-like member and the main body member of the load sensor;
    other of the shaft-like member and the main body member of the load sensor is connected to the second member; and
    the connecting pin is arranged, in a front view of the load sensor as viewed in the axial direction, on an acting line of the load which is applied to the load sensor associating with a movable operation of the operational member, at a position generating tensile force in the transmittal link, so that a pivotal movement of the transmittal link about the connecting pin or the load sensor associating with the movable operation of the operational member maintains the direction of relative displacement between the shaft-like member and the main body member of the load sensor constant.

2. The load sensor-equipped operating apparatus according to claim 1, wherein
    the load sensor is rockable relative to the first member about the connecting pin, and
    the transmittal link is pivoted integrally with the load sensor about the connecting pin relative to the first member associating with the movable operation of the operational member.

3. The load sensor-equipped operating apparatus according to claim 2, wherein
    the first member is a plate-shaped member, the connecting pin passes through the first member, and the pair of transmittal links are arranged on both side surfaces of the first member and are connected to both ends of the connecting pin,
    the main body member of the load sensor protrudes from both side surfaces of the plate-shaped first member, is rockable about the connecting pin, and is secured integrally to the pair of transmittal links on both ends thereof in the axial direction, and
    the second member is connected to both ends of a sensor pin which is inserted into the shaft-like member along an axis thereof and protrudes from both sides of the main body member.

4. The load sensor-equipped operating apparatus according to claim 2, wherein
    in the front view of the load sensor as viewed in the axial direction, the second member has an positioning hole to be located on the acting line of the load applied to the load sensor with the movable operation of the operational member at the position corresponding to the connecting pin, and to be in parallel to the acting line, and the positioning hole is engaged with the connecting pin to determine an orientation of the second member provided with the positioning hole and the transmittal link.

5. The load sensor-equipped operating apparatus according to claim 2, wherein the second member is the reaction force member, and the load sensor detects the operating force which is transmitted to the reaction force member.

6. The load sensor-equipped operating apparatus according to claim 1, wherein
the connecting pin is rockable about the load sensor relative to the second member, and
the transmittal link is pivoted about the load sensor integrally with the load sensor relative to the second member associating with the movable operation of the operational member.

7. The load sensor-equipped operating apparatus according to claim 6, wherein
the second member is a plate-shaped member, and the main body member is pivotably arranged in a sensor accommodating hole which penetrates the second member,
the pair of transmittal links are arranged on both side surfaces of the plate-shaped second member and are integrally secured to both ends of the shaft-like member which protrudes from both side surfaces of the main body member in the axial direction, and
the connecting pin is connected to the pair of transmittal links bridging thereover.

8. The load sensor-equipped operating apparatus according to claim 6, wherein
the main body member of the load sensor is pivotably arranged in the second member, and the transmittal link is integrally secured to the shaft-like member,
a sensor pin is arranged in the shaft-like member to be inserted along the axis,
the first member has an positioning hole which is arranged, in the front view as viewed in the axial direction, to be located at the position corresponding to the sensor pin and to be in parallel to the acting line of the load, and the positioning hole is engaged with the sensor pin to determine the orientation of the first member provided with the positioning hole and the transmittal link.

9. The load sensor-equipped operating apparatus according to claim 6, wherein the first member is the reaction force member, and the load sensor detects the operating force which is transmitted to the reaction force member.

10. The load sensor-equipped operating apparatus according to claim 1, wherein
the operational member is an operational pedal movably mounted on a pedal support secured to a vehicle body and depressed by a driver, and
the load sensor-equipped operating apparatus is a vehicle operating pedal apparatus equipped with the load sensor.

11. The load sensor-equipped operating apparatus according to claim 10, wherein
the operational pedal is mounted on the pedal support to be pivotable about a support axis and is directly connected to the reaction force member via the pivotal connecting portion, and
the load sensor is arranged within the pivotal connecting portion.

12. The load sensor-equipped operating apparatus according to claim 10, further comprising an intermediate lever which is pivotably mounted on the pedal support, is connected to the operational pedal via a connecting link, and is connected to the reaction force member via the pivotal connecting portion,
wherein the load sensor is arranged in the pivotal connecting portion between the intermediate lever and the reaction force member.

13. The load sensor-equipped operating apparatus according to claim 1, wherein the deformable member has a cylindrical shape one end and other end of which are integrally secured to the main body member and the shaft-like member respectively, so that the strain detecting element detects the shear strain generated in the deformable member when the main body member and the shaft-like member are relatively displaced by the reaction force.

* * * * *